US012717993B2

(12) United States Patent
Imi et al.

(10) Patent No.: US 12,717,993 B2
(45) Date of Patent: Aug. 25, 2026

(54) ARITHMETIC METHOD AND ARITHMETIC DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hitoshi Imi, Yokohama Kanagawa (JP); Motochika Okano, Chuo Tokyo (JP); Hidetoshi Miyahara, Kawasaki Kanagawa (JP); Takahiro Aoki, Gyoda Saitama (JP)

(73) Assignees: KABUSHIKI KAISHA TOSHIBA, Kawasaki (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 774 days.

(21) Appl. No.: 18/180,803

(22) Filed: Mar. 8, 2023

(65) Prior Publication Data

US 2024/0046017 A1 Feb. 8, 2024

(30) Foreign Application Priority Data

Aug. 8, 2022 (JP) ................................ 2022-126635

(51) Int. Cl.
*G06F 30/367* (2020.01)
*G06F 119/06* (2020.01)

(52) U.S. Cl.
CPC ........ *G06F 30/367* (2020.01); *G06F 2119/06* (2020.01)

(58) Field of Classification Search
None
See application file for complete search history.

(56) References Cited

U.S. PATENT DOCUMENTS 6,959,250 B1 10/2005 Shimazaki et al.
11,143,691 B2 10/2021 Katsumata et al.
(Continued)

FOREIGN PATENT DOCUMENTS

JP 2001028013 A 1/2001
JP 2007198965 A 8/2007
(Continued)

OTHER PUBLICATIONS

Japanese Office Action (and an English translation thereof) dated Aug. 26, 2025, issued in counterpart Japanese Application No. 2022-126635.

*Primary Examiner* — Leigh M Garbowski
(74) *Attorney, Agent, or Firm* — Holtz, Holtz & Volek PC

(57) ABSTRACT

An arithmetic method by a computer according to the present embodiment includes model generating, execution processing, and electromagnetic interference noise generating. The model generating generates a model including a circuit model configured by a plurality of element models connected to each other and a motor model driven by the circuit model. The execution processing computes a motor current of the motor model generated in each of first calculating steps over time by using information on electrical characteristics of each element model. The electromagnetic interference noise generating generates electromagnetic interference noise in accordance with a frequency at a predetermined measurement point in the model in each of predetermined time segments in a measurement period, and generates an electromagnetic interference noise level at each frequency in the measurement period based on an electromagnetic interference noise level in accordance with the frequency in each of the time segments.

18 Claims, 35 Drawing Sheets

1
10 INFORMATION INPUT PORTION
20
20a MODEL DB ·THREE PHASE FPS ·AAA ·BBB
20b ELEMENT MODEL DB ·TP7904 ·aaa ·bbb
20c NOISE TABLE DB ·aaa ·bbb
30 MODEL GENERATOR
40 EXECUTION PROCESSOR
50 OUTPUT PORTION
60 NOISE MODEL GENERATOR
70 DISPLAY

| | | EMI TABLE (FREQUENCY) | | | | |
|---|---|---|---|---|---|---|
| | | 1MHz | 1.03MHz | · · · | 100MHz | INTERPOLATION |
| MOTOR CURRENT | 10[A] | 42.24 | 46.35 | · · · | 21.46 | LINEAR INTERPOLATION |
| | 20[A] | 44.56 | 49.74 | · · · | 28.75 | |
| | 30[A] | 48.73 | 56.34 | · · · | 33.37 | |
| | : | · | : | : | · | |

(56) References Cited

U.S. PATENT DOCUMENTS

| | | | | |
|---|---|---|---|---|
| 11,268,857 | B2 | 3/2022 | Nakamura et al. | |
| 2016/0063171 | A1 | 3/2016 | Tripathi et al. | |
| 2021/0271473 | A1 | 9/2021 | Imi et al. | |
| 2021/0325247 | A1 | 10/2021 | Nakamura et al. | |
| 2022/0231624 | A1* | 7/2022 | Balamurali | H02P 6/08 |
| 2023/0003777 | A1* | 1/2023 | Petter | B64D 27/34 |

FOREIGN PATENT DOCUMENTS

| | | | |
|---|---|---|---|
| JP | 2009193513 | A | 8/2009 |
| JP | 2018141633 | A | 9/2018 |
| JP | 6533024 | B1 | 5/2019 |
| JP | 2021140755 | A | 9/2021 |
| JP | 6965906 | B2 | 10/2021 |

* cited by examiner

| | | EMI TABLE (FREQUENCY) | | | | |
|---|---|---|---|---|---|---|
| | | 1MHz | 1.03MHz | · · · | 100MHz | INTERPOLATION |
| MOTOR CURRENT | 10[A] | 42.24 | 46.35 | · · · | 21.46 | LINEAR INTERPOLATION |
| | 20[A] | 44.56 | 49.74 | · · · | 28.75 | |
| | 30[A] | 48.73 | 56.34 | · · · | 33.37 | |
| | : | : | : | : | : | |

FIG. 16

FIG. 19
MOTOR CURRENT VALUE
EMI
TABLE MODEL
EMI PREDICTION VALUE

OUTPUT RESULT OF MAXIMUM-VALUE HOLDING METHOD

| | | THERMAL TABLE | | |
|---|---|---|---|---|
| | | Turn-on [Ws] | Turn-off [Ws] | INTERPOLATION |
| MOTOR CURRENT | 10[A] | 0.52e-4 | 0.87e-4 | INTERPOLATION USING QUADRATIC FUNCTION |
| | 20[A] | 1.16e-4 | 1.65e-4 | |
| | 30[A] | 1.74e-4 | 2.54e-4 | |
| | : | : | : | |

FIG. 28B

ARITHMETIC METHOD AND ARITHMETIC DEVICE

CROSS-REFERENCE TO RELATED APPLICATIONS

This application is based upon and claims the benefit of priority from the prior Japanese Patent Application No. 2022-126635, filed on Aug. 8, 2022 the entire contents of which are incorporated herein by reference.

FIELD

Embodiments of the present invention relate to an arithmetic method and an arithmetic device.

BACKGROUND

For an electric circuit using a designed element, circuit simulation is carried out in order to evaluate the electric operation characteristics. This circuit simulation is performed by a circuit simulator such as a SPICE (Simulation Program with Integrated Circuit Emphasis) that strictly considers physical characteristics.

Further, noise characteristics and the like in a case of using a designed element in an automobile or an aircraft are regarded as important for security. Therefore, for the electric circuit, electromagnetic interference (EMI) noise may be simulated in addition to the electric operation characteristics.

In such circuit simulation, many elements of the electric circuit, for example, a transistor, a resistor, and a capacitor are modeled as element models, and a transient phenomenon is computed.

However, electromagnetic interference noise simulation requires frequency analysis and the like, and therefore has to be performed in calculating steps shorter than steps in general circuit simulation. Therefore, strict computation of the transient phenomenon in electromagnetic interference noise simulation takes a lot of time.

BRIEF DESCRIPTION OF THE DRAWINGS

FIG. 16 is a table illustrating an example of an EMI table;

FIG. 28B is a table illustrating an example of a thermal model table;

DETAILED DESCRIPTION

Figure 1:
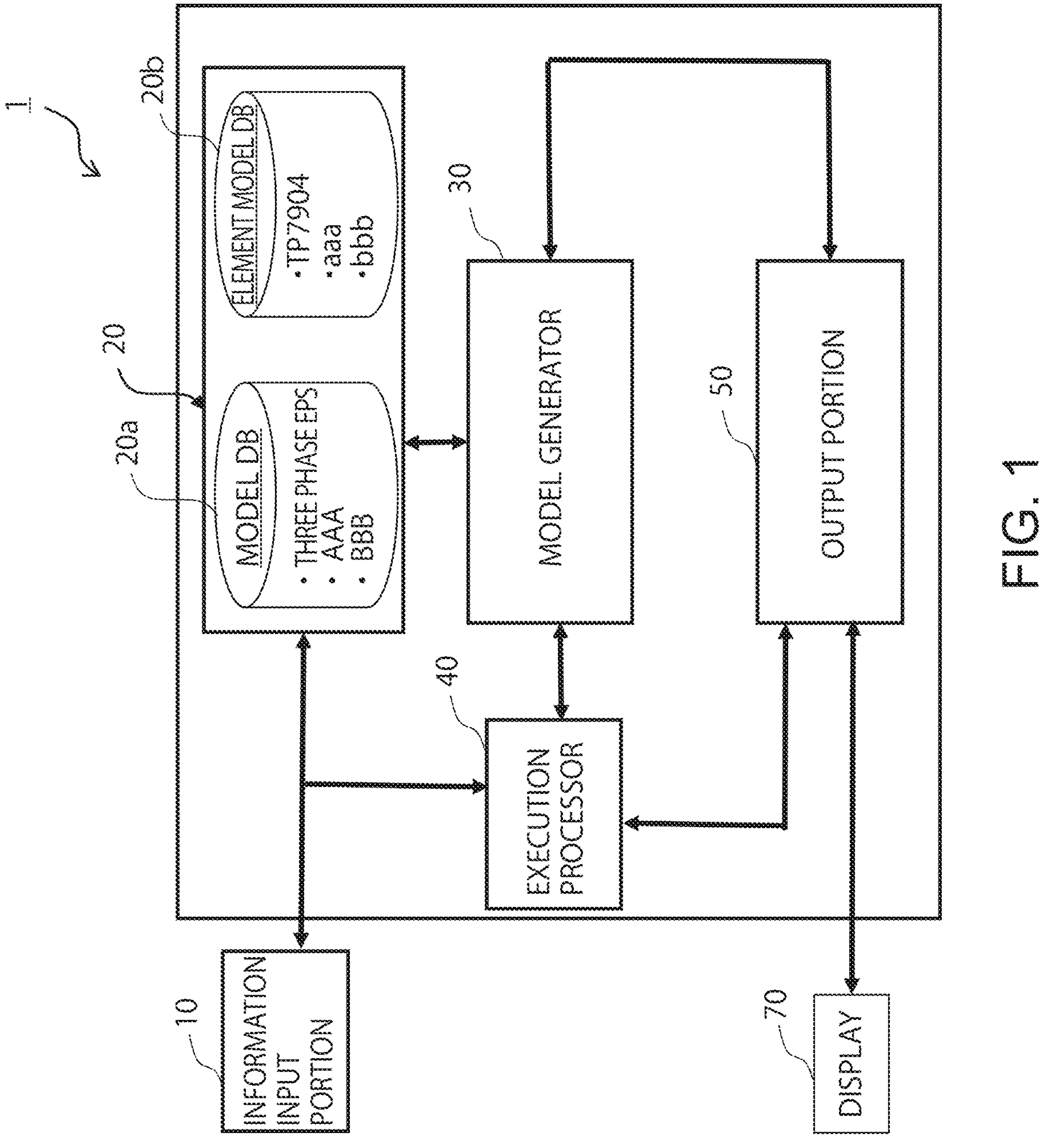
FIG. 1 is a block diagram illustrating a configuration of an arithmetic device according to a first embodiment.

Embodiments of the present invention have been made in view of the above circumstance, and aim to provide an arithmetic method and an arithmetic device that can compute electromagnetic interference noise simulation in a shorter time.

An arithmetic method by a computer according to the present embodiment includes model generating, execution processing, and electromagnetic interference noise generating. The model generating generates a model including a circuit model configured by a plurality of element models each having information on electrical characteristics of a switching element and connected to each other and a motor model driven by the circuit model. The execution processing computes a motor current of the motor model generated in each of first calculating steps by switching of the element models over time with respect to first input values arranged along a time in a measurement period by using information on electrical characteristics of each element model. The electromagnetic interference noise generating generates electromagnetic interference noise in accordance with a frequency at a predetermined measurement point in the model in each of predetermined time segments in a measurement period, and generates an electromagnetic interference noise level at each frequency in the measurement period based on an electromagnetic interference noise level in accordance with the frequency in each of the time segments.

An arithmetic method and an arithmetic device according to embodiments of the present invention will now be explained in detail with reference to the drawings. The embodiments described below are only examples of the embodiments of the present invention and the present invention is not limited to the embodiments. In the drawings referred to in the embodiments, same parts or parts having identical functions are denoted by like or similar reference characters and there is a case where redundant explanations thereof are omitted. Further, there are cases where dimensional ratios of the parts in the drawings are different from those of actual products and some part of configurations is omitted from the drawings.

First Embodiment

FIG. 1 is a block diagram illustrating a configuration of an arithmetic device 1 according to a first embodiment. As illustrated in FIG. 1, the arithmetic device 1 according to the present embodiment is, for example, a SPICE and is a circuit simulator device that carries out circuit simulation. This arithmetic device 1 includes an information input portion 10, a storage 20, a model generator 30, an execution processor 40, an output portion 50, and a display 70. This arithmetic device 1 is implemented by a desktop personal computer, for example. That is, the arithmetic device 1 is configured to include a CPU (Central Processing Unit), for example.

The information input portion 10 includes, for example, a keyboard and a pointing device, and outputs an instruction signal in accordance with an operation by a user who uses the arithmetic device 1 to the storage 20, the model generator 30, and the execution processor 40. For example, the instruction signal output from the information input portion 10 includes at least any of circuit information that is instruction information configuring a circuit model, parts information that is instruction information configuring an element model, and analysis setting information that is a condition under which circuit simulation is carried out.

The storage 20 is configured by an HDD (hard disk drive) or an SSD (solid state drive), for example. The storage 20 includes a model database 20*a* and an element model database 20*b*. The model database 20*a* stores information on a plurality of models 80 therein. The element model database 20*b* stores therein a plurality of element models 88 that configure the model 80. The storage 20 also stores therein various types of programs for carrying out simulation. Accordingly, the arithmetic device 1 configures each portion, for example, by executing the programs stored in the storage 20.

Figure 2:
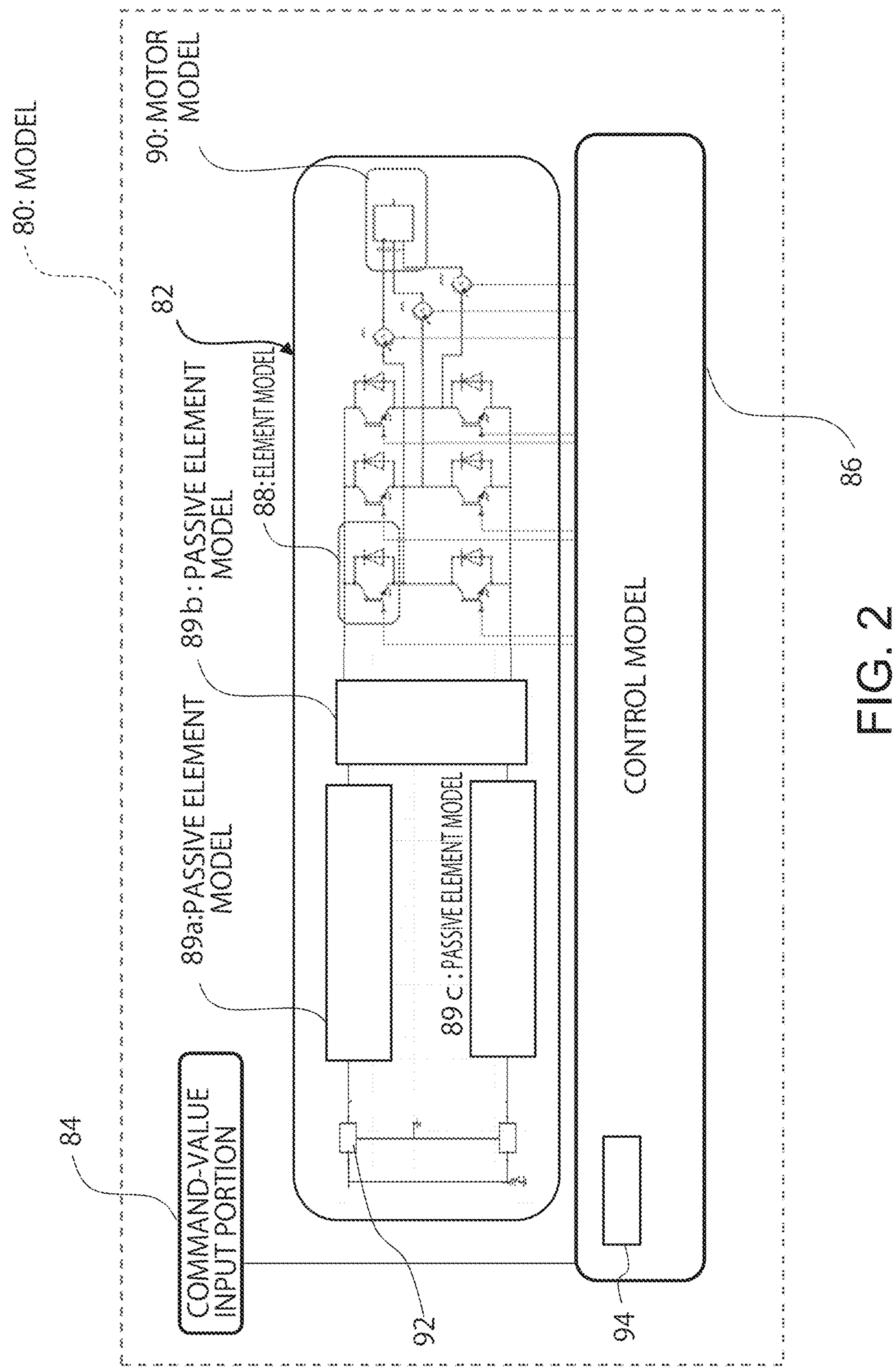
FIG. 2 is a diagram illustrating a configuration example of a model.

FIG. 2 is a diagram illustrating a configuration example of the model 80. As illustrated in FIG. 2, the model 80 is, for example, a model of an inverter device that rotates a motor. This model 80 is a model configured by characteristics information of the inverter device that is an object of simulation. This model 80 includes, for example, a circuit model 82, a command-value input portion 84, and a control model 86. The circuit model 82 includes a plurality of the element models 88, a plurality of passive element models 89*a*, 89*b*, and 89*c*, and a motor model 90. Details of the model 80 will be described later. The control model 86 includes a noise measurement processor 94.

The model generator 30 configures the model 80 in accordance with information input from the information input portion 10. The model generator 30 also configures the element models 88 and the passive element models 89*a*, 89*b*, and 89*c* in the model 80 in accordance with the input information. For example, the element models 88 and the passive element models 89*a*, 89*b*, and 89*c* in the model 80 can be changed in accordance with input from the information input portion 10. That is, this model generator 30 generates the model 80 that has the circuit model 82 in which the element models 88 each having information on electrical characteristics of a switching element are connected to each other and has the motor model 90 driven by the circuit model 82.

The execution processor 40 computes currents and voltages of the element models 88, the passive element models 89*a*, 89*b*, and 89*c*, and wires in the model 80 in each calculating step by using information on the configured model 80. This execution processor 40 computes a circuit equation such as a first-order linear differential equation or a second-order linear differential equation, which follows the laws of physics such as the Kirchhoff's law, in each calculating step and computes transient responses of a current and a voltage in each calculating step. For example, this execution processor 40 computes a motor current of the motor model 90 generated in each calculating step by switching of the element models 88 with respect to a first input value (for example, corresponding to an input value from the command-value input portion 84 described later) over time in a measurement period by using information on the electrical characteristics of each element model 88.

The output portion 50 stores therein the result of the execution process by the execution processor 40 for each calculating step, and outputs it to the storage 20. That is, the output portion 50 includes an auxiliary storage. The auxiliary storage is configured by an HDD (hard disk drive) or an SSD (solid state drive), for example. Further, the output portion 50 generates a display image and outputs it to the display 70.

The display 70 is, for example, a monitor. The display 70 displays image information input from the output portion 50.

Here, details of the model 80 are described. As illustrated in FIG. 2, the circuit model 82 has information on electrical characteristics of parts that configure a circuit. The circuit model 82 includes, for example, the element models 88, the passive element models 89*a*, 89*b*, and 89*c*, the motor model 90, a noise measurement portion 92, and the noise measurement processor 94. The element model 88 has, for example, information on a connection relation between a resistive element, a capacitive element (a capacitor), a passive element that stores energy in a magnetic field (a coil), and a switching element (e.g., a MOSFET) that is an active element, and information on electrical characteristics of each of them. Details of the element model 88 will be described later. Each of the passive element models 89*a*, 89*b*, and 89*c* is configured by, for example, a combination of a resistive element, a capacitive element (a capacitor), and a passive element that stores energy in a magnetic field (a coil).

The motor model 90 has information on electrical characteristics of a motor. For example, information on a relation between a supplied current and a voltage and a generated motor torque, for example, is defined in the motor model 90. Accordingly, when a current value and a voltage value over time are supplied to the motor model 90, for example, a motor torque over time is output.

The command-value input portion 84 inputs a command value over time for causing the model 80 to operate. In a case where the model 80 is, for example, an inverter device, the command value is a control value that causes generation of the number of motor revolutions over time. In that case, a power supply model (not illustrated) is also included. The control value may be a motor torque corresponding to a current value over time.

The command value may be actual data acquired by an actual machine, for example. Alternatively, the value may be a simulation value computed in conjunction with a mechanical model as described later. Accordingly, it is possible to compute, in each calculating step, a current value and a voltage value when the inverter device as an object of simulation is caused to generate the number of motor revolutions or the motor torque by using the control command value.

The control model 86 is a model performing an operation of a control device that controls the model 80 in accordance with the command value over time. The control model 86 has information on a circuit configuration in the control device, and can output a control signal to each constituent element of the model 80 when the command value over time is input to the control model 86. In a case where the model 80 is an inverter device, for example, when a control value over time that causes generation of a target number of motor revolutions is input to the control model 86, the control model 86 controls a switching timing of each element model 88 so as to generate the target number of motor revolutions in accordance with time. In this case, power is supplied from a power supply model.

Figure 3:
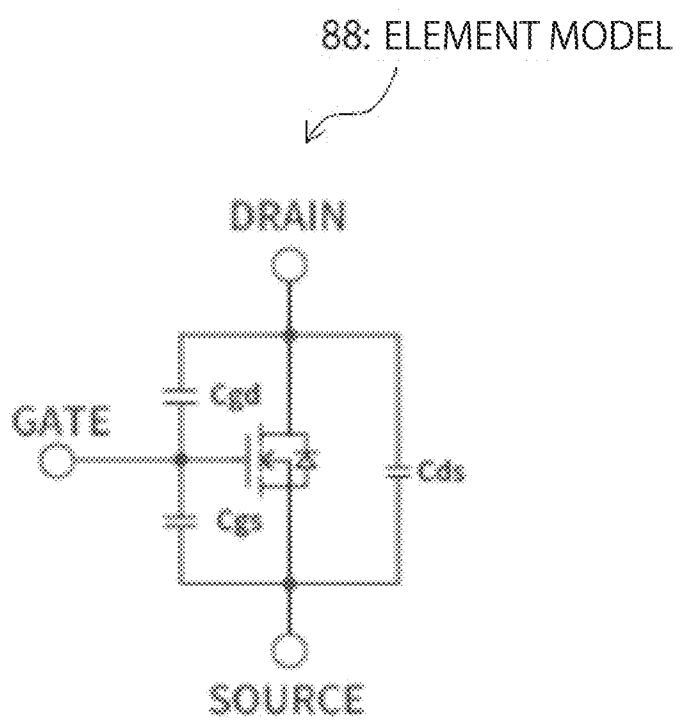
FIG. 3 is a diagram illustrating an example of an element model.

FIG. 3 is a diagram illustrating an example of the element model 88. As illustrated in FIG. 3, the element model 88 is, for example, a model of a MOSFET that is an active element. In a case where the element model 88 is, for example, a model of a MOSFET that is an active element, information for computing a transient response of the MOSFET, for example, electrostatic capacitances Cgs and Cgd of an oxide film, a junction capacitance Cds of a built-in diode, information on a switching time, and a threshold voltage VGS(th), is defined as electrical characteristics.

Examples of the element model 88 include, in addition to the active element, a resistive element that is a passive element, a capacitive element (a capacitor), and a passive element that stores energy in a magnetic field (a coil). Information on these passive elements is defined as a resistance value, a capacitance value, and an inductance.

Figure 4:
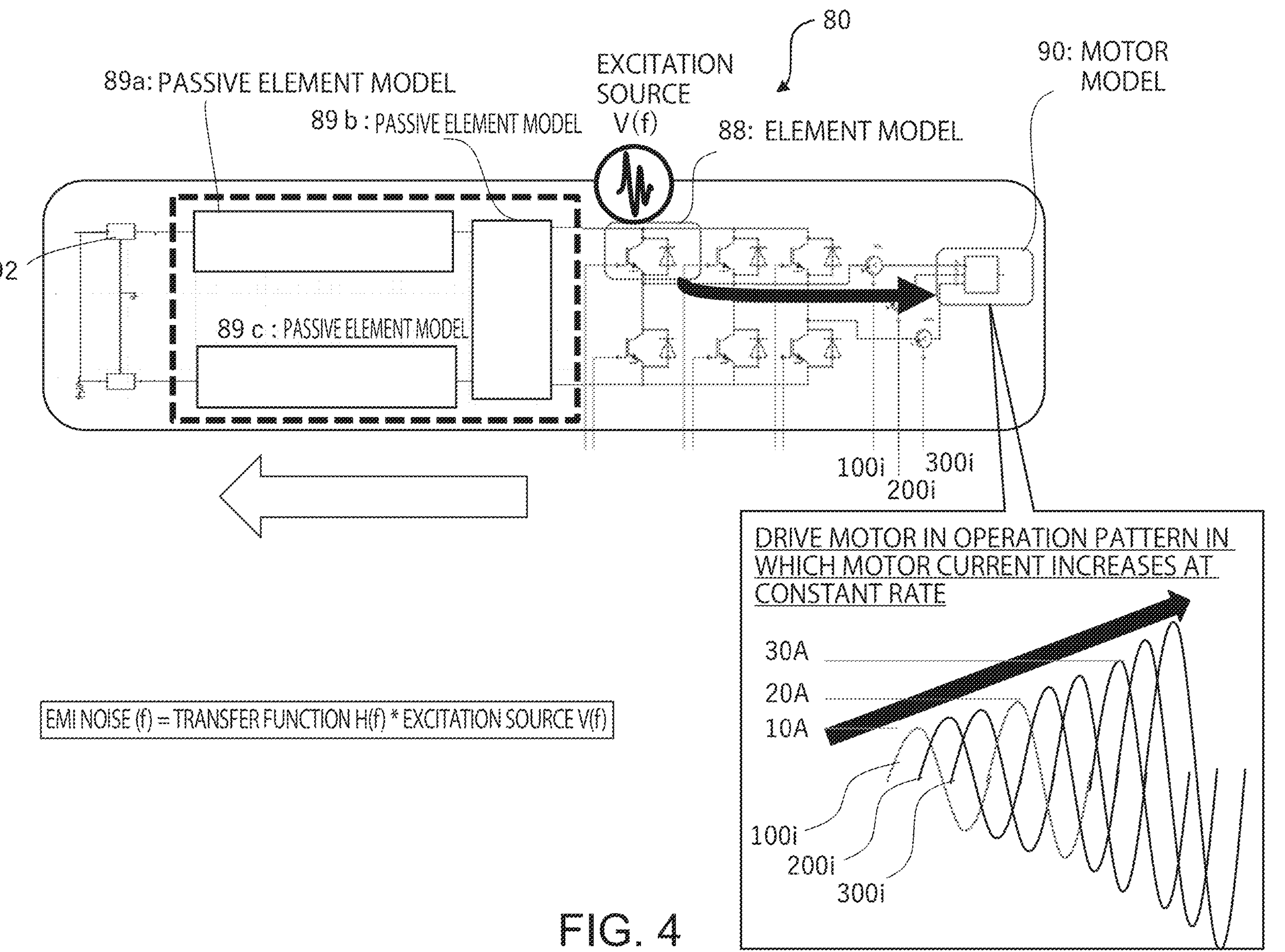
FIG. 4 is a concept diagram of a measurement system including element models as an excitation source.

FIG. 4 is a concept diagram of a measurement system of the noise measurement portion 92 that includes the element models 88 as an excitation source. As illustrated in FIG. 4, the noise measurement portion 92 measures electromagnetic interference noise (EMI noise) at a predetermined measurement point. FIG. 4 illustrates an example of monotonically increasing a motor current as a control value of the motor model 90. Currents 100*i*, 200*i*, and 300*i* respectively represent currents in three phases of the motor model 90.

The excitation source of EMI noise in the present embodiment is the plurality of element models 88. That is, the noise measurement portion 92 measures a transient response of a voltage generated by a switching operation of the element models 88. This measurement value is transmitted to the noise measurement processor 94. The noise measurement processor 94 then carries out frequency analysis. The noise measurement processor 94 measures a frequency component at each frequency at the predetermined measurement point, for example, a point at which the noise measurement portion 92 is arranged, as a noise level at each frequency. In this measurement system, when the element models 88 are regarded as an excitation source V(f), for example, the passive element models 89*a*, 89*b*, and 89*c*, for example, function as a transfer function H(f). Here, f is a frequency, V(f) is a voltage of the excitation source, and H(f) is a transfer function. An EMI noise level (f) is thus represented by Expression (1). The EMI noise level (f) indicates a level of EMI noise at each frequency f.

[Expression 1]

$$\text{EMI noise level}(f) = H(f) \times V(f) \quad (1)$$

The noise measurement processor 94 performs Fourier transform on a voltage value within a predetermined time at the predetermined measurement point and measures a frequency component at each frequency f as the EMI noise level (f). More specifically, the noise measurement processor 94 stores a voltage value over time within the measurement time at the predetermined measurement point in the storage 20 (see FIG. 1) via the output portion 50 (see FIG. 1). Next, the noise measurement processor 94 performs Fourier transform on the stored voltage value over time within the predetermined time to measure a noise level at each frequency f, for example, a frequency component as the EMI noise level (f).

Figures 5A, 5B, 5C:
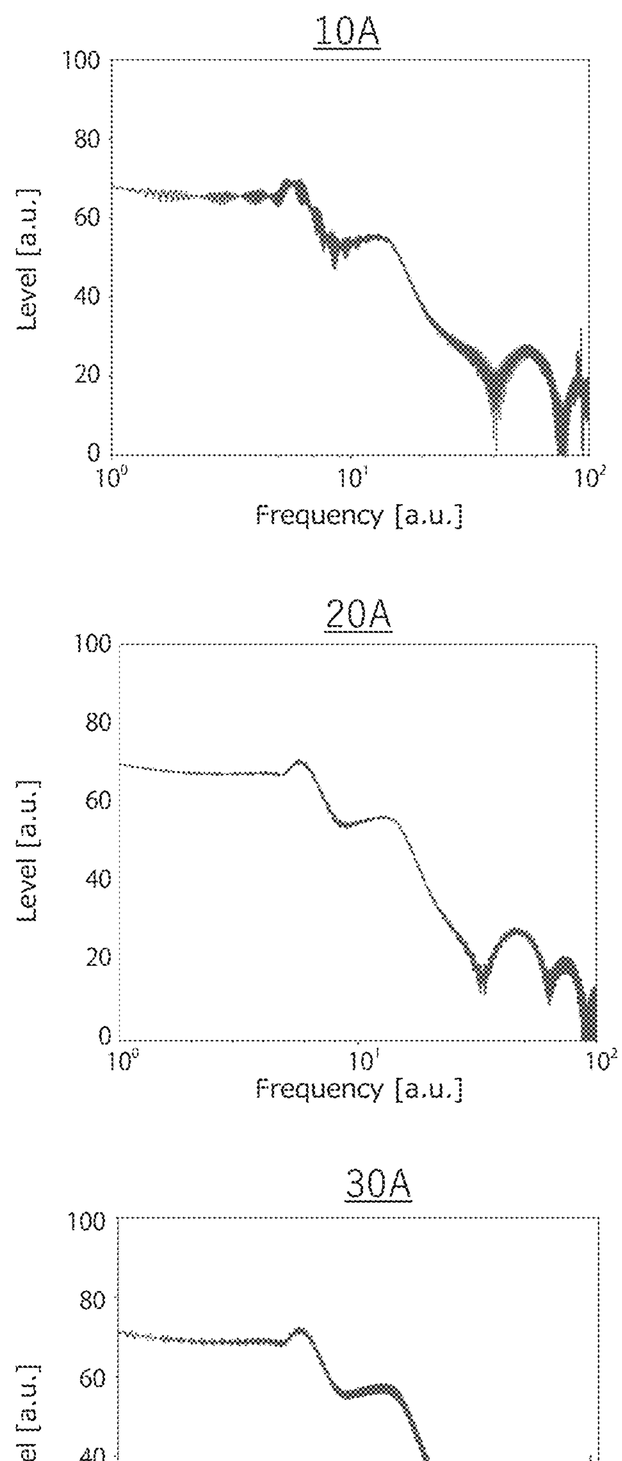
FIG. 5A is a diagram illustrating measurement example of an EMI noise level at 10 amperes.
FIG. 5B is a diagram illustrating measurement example of an EMI noise level at 20 amperes.
FIG. 5C is a diagram illustrating measurement example of an EMI noise level at 30 amperes.

FIG. 5 includes diagrams illustrating result examples of measurement by the noise measurement processor 94. Diagrams A, B, and C illustrate measurement examples of the EMI noise level (f) at 10 amperes, 20 amperes, and 30 amperes at the measurement point in FIG. 4, respectively. The vertical axis represents a level of EMI noise, and the horizontal axis represents a frequency. For example, the magnitude of the EMI noise level (f) in a predetermined time range is changed in accordance with a current of the motor model 90, for example, linearly and has quantitatively similar characteristics.

Figure 6:
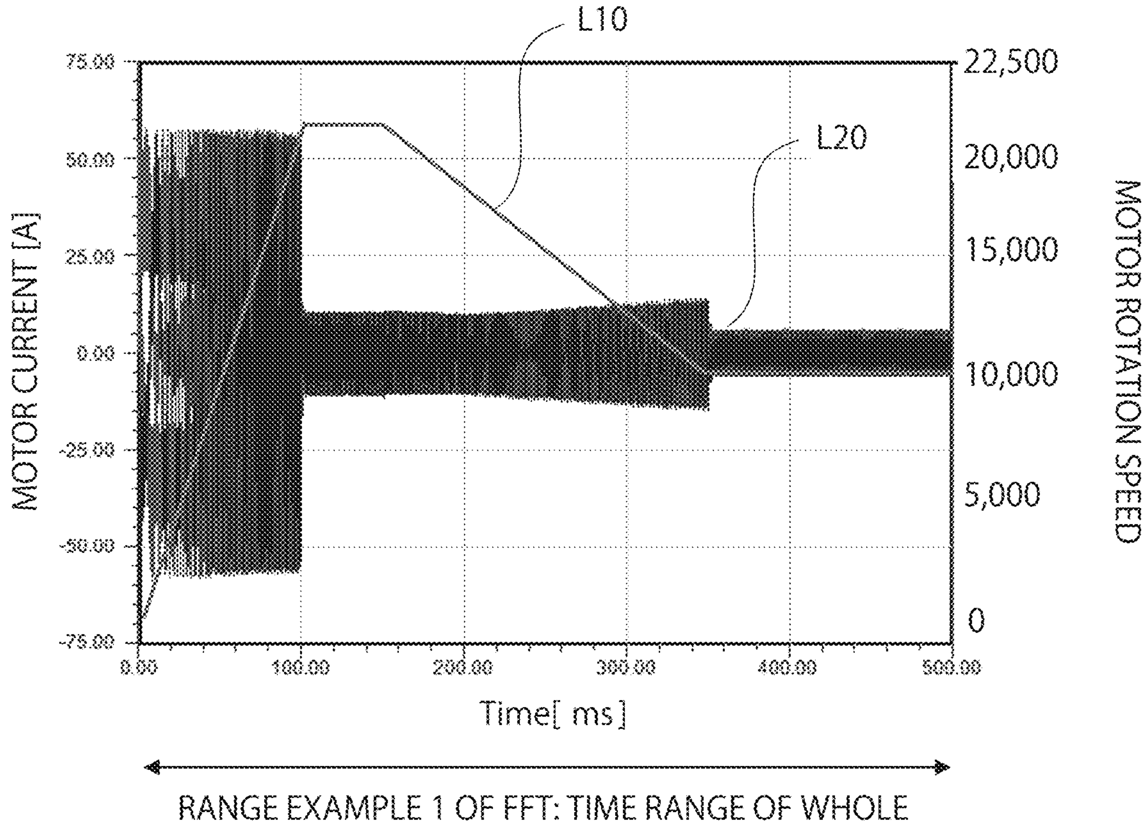
FIG. 6 is a diagram illustrating an example of motor control in an actual operation.

FIG. 6 is a diagram illustrating an example of motor control in an actual operation. The vertical axis represents a rotation speed of the motor model 90 and amplitude values of motor currents in three phases, and the horizontal axis represents a time. A rotation speed L10 represents an accelerated state, a constant-speed state, a decelerated state, and a constant-speed state, and an amplitude L20 represents amplitude waveforms of the motor currents in three phases. That is, the command-value input portion 84 supplies a control value for generating the rotation speed L10 over time to the control model 86 as a command value.

Figure 7:
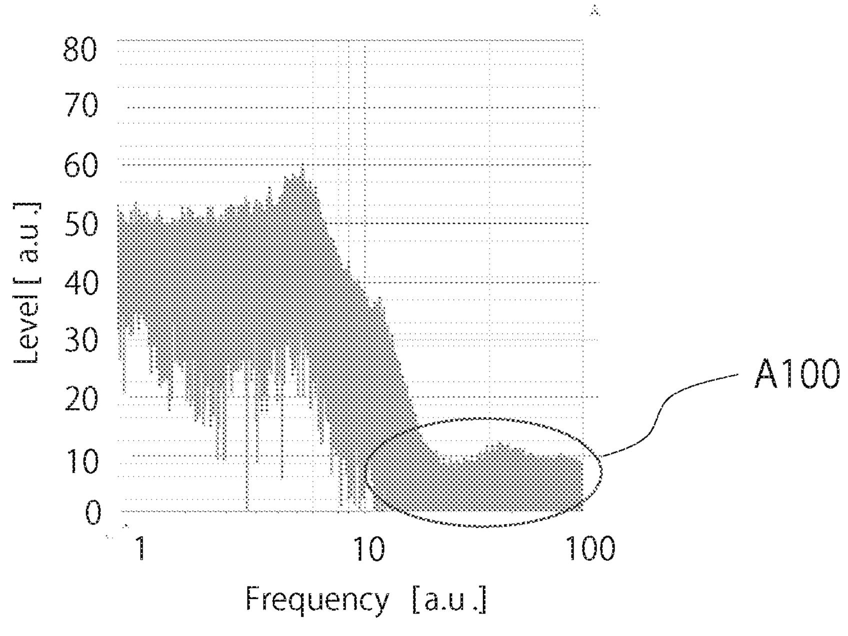
FIG. 7 is a diagram illustrating a measurement result in a comparative example at a rotation speed illustrated in FIG. 6.

FIG. 7 is a diagram illustrating a measurement result in a comparative example at the rotation speed L10 illustrated in FIG. 6. The horizontal axis represents a frequency, and the vertical axis represents an EMI noise level. In conventional EMI noise analysis generally performed, frequency analysis is performed for a voltage change value over time in the entire measurement period of 500 milliseconds, as in the comparative example.

Figure 8:
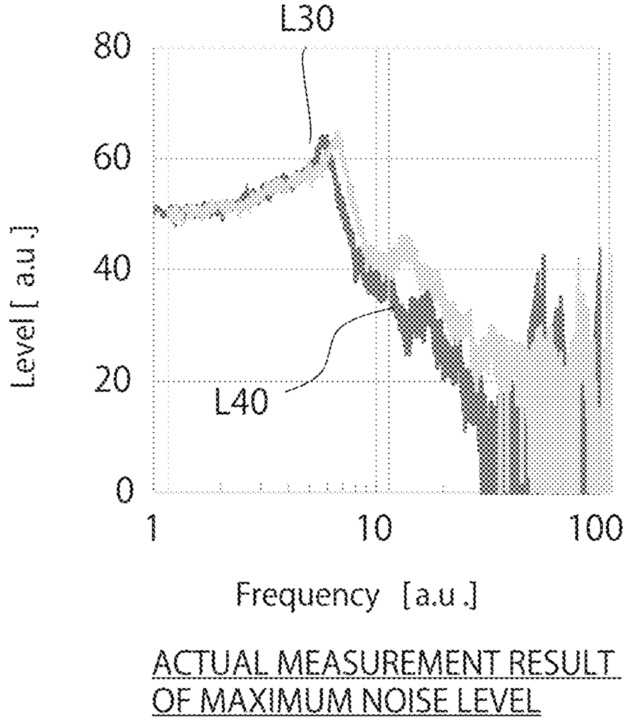
FIG. 8 is a diagram illustrating a measurement example in an actual machine at the rotation speed illustrated in FIG. 6.

FIG. 8 is a diagram illustrating a measurement example by an EMI noise measurement device in an actual machine at the rotation speed L10 illustrated in FIG. 6. The horizontal axis represents a frequency, and the vertical axis represents an EMI noise level. A line 30 and a line 40 indicate a difference between switching speeds of the element model 88. In this example, a switching speed of a measurement result indicated by the line L30 is faster than that of a measurement result indicated by the line L40.

When the comparative example in FIG. 7 and the actual measurement value in FIG. 8 are compared with each other, the measurement value by the noise measurement processor 94 tends to be smaller at high frequencies, as indicated in a region A100 in FIG. 7. In the comparative example, values of frequency components are averaged because Fourier transform is performed in the entire measurement range, so that a deviation is generated.

Figure 9:
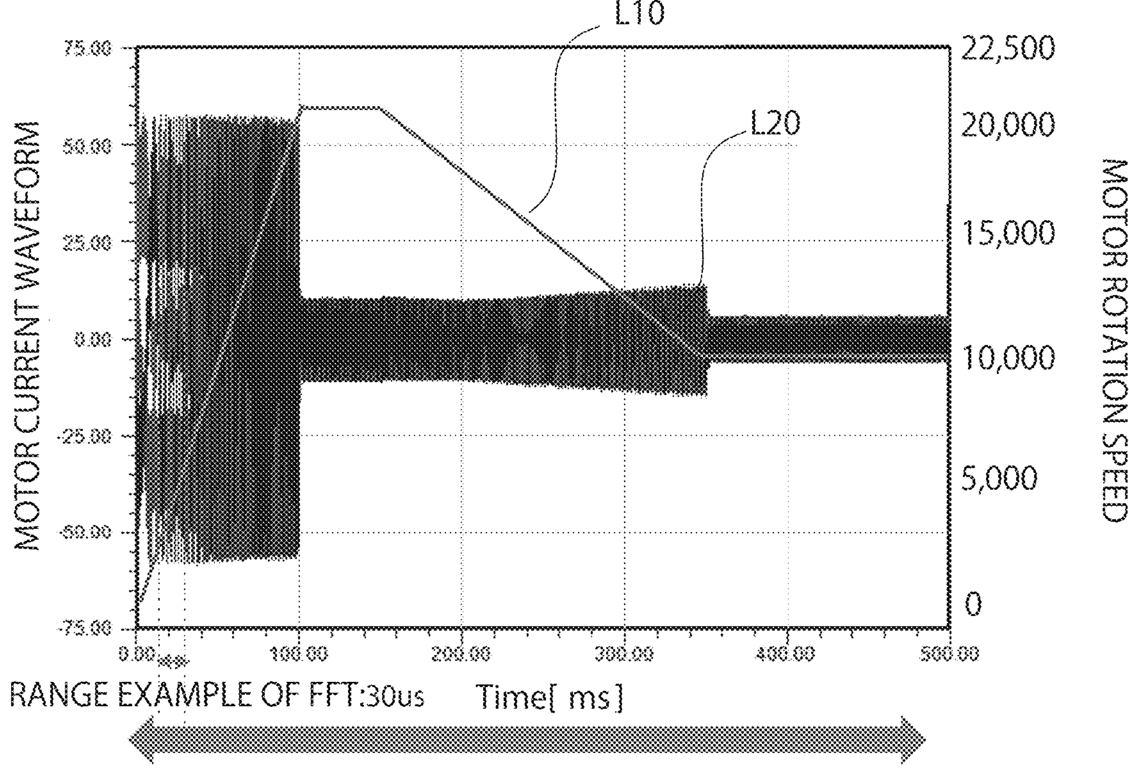
FIG. 9 is an explanatory diagram of a process example by the noise measurement processor according to the present embodiment.

FIG. 9 is an explanatory diagram of a process example by the noise measurement processor 94 according to the present embodiment. As illustrated in FIG. 9, the noise measurement processor 94 according to the present embodiment generates EMI (electromagnetic interference) noise in accordance with a frequency based on a measurement value of the noise measurement portion 92 that is a predetermined measurement point in the model 80 (see FIG. 4) in each predetermined time segment (e.g., a calculation time of 30 microseconds) in a measurement period (e.g., 500 milliseconds), and generates an EMI noise level at each frequency in the measurement period based on the electromagnetic interference noise level in accordance with the frequency in each time segment.

More specifically, in the noise measurement processor 94 according to the present embodiment, the calculation time is divided into measurement time segments of, for example, 30 microseconds, and frequency analysis is performed for a voltage change value over time in each measurement time segment. Every time frequency analysis in each measurement time segment is ended, the EMI noise level at each frequency is replaced with the maximum EMI noise level measured so far, and that maximum value is saved in the storage 20 (see FIG. 1). By repeating these processes, the EMI noise level at each frequency is replaced with the maximum EMI noise level measured so far at each frequency. The method according to the present embodiment may be referred to as the maximum-value holding method (the Maxhold method). As described above, the noise measurement processor 94 according to the present embodiment generates, among EMI noise levels generated to correspond to respective frequencies in each predetermined time segment (e.g., a computation time of 30 microseconds), the maximum EMI noise level at each frequency as the EMI noise level at each frequency in the measurement period.

Figure 10:
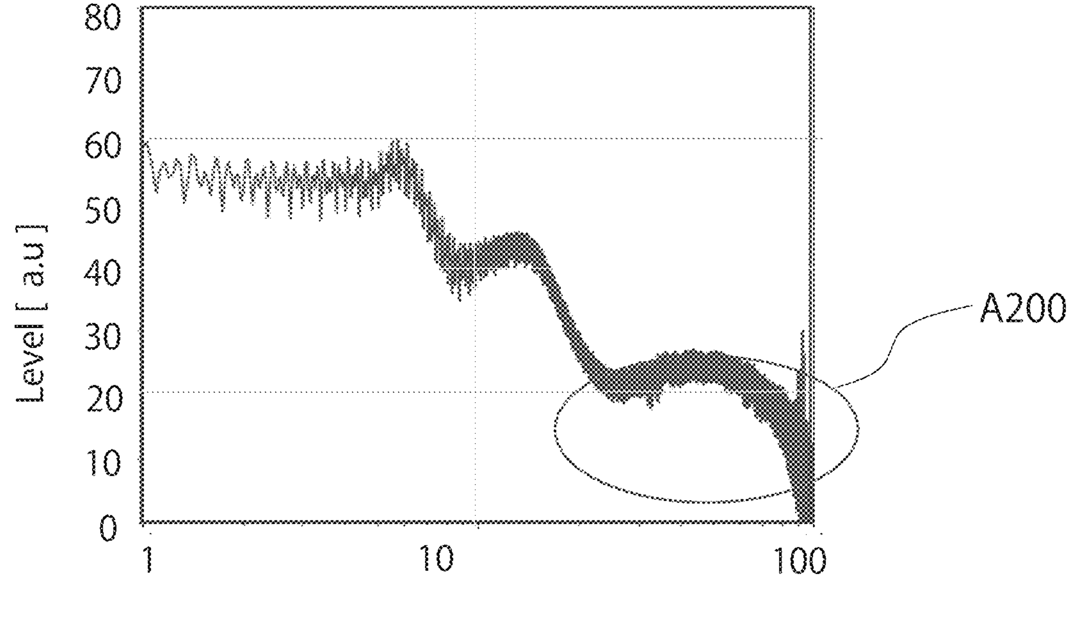
FIG. 10 is a diagram illustrating a measurement example by the noise measurement processor.

FIG. 10 is a diagram illustrating a measurement example by the noise measurement processor 94 in the control example that generates the rotation speed L10 illustrated in FIG. 9. The horizontal axis represents a frequency, and the vertical axis represents an EMI noise level. This result shows that, in measurement by the maximum-value holding method according to the present embodiment, the deviation in a high-frequency region is eliminated as illustrated in a region A200. It is considered that this is because, in the measurement example by the noise measurement processor 94 by the maximum-value holding method according to the present embodiment, a measurement time is divided into measurement time segments of 30 microseconds, and frequency analysis is performed on a voltage change value in each measurement time segment, so that the feature of a frequency component in each measurement time segment is obtained without being averaged.

Figure 11:
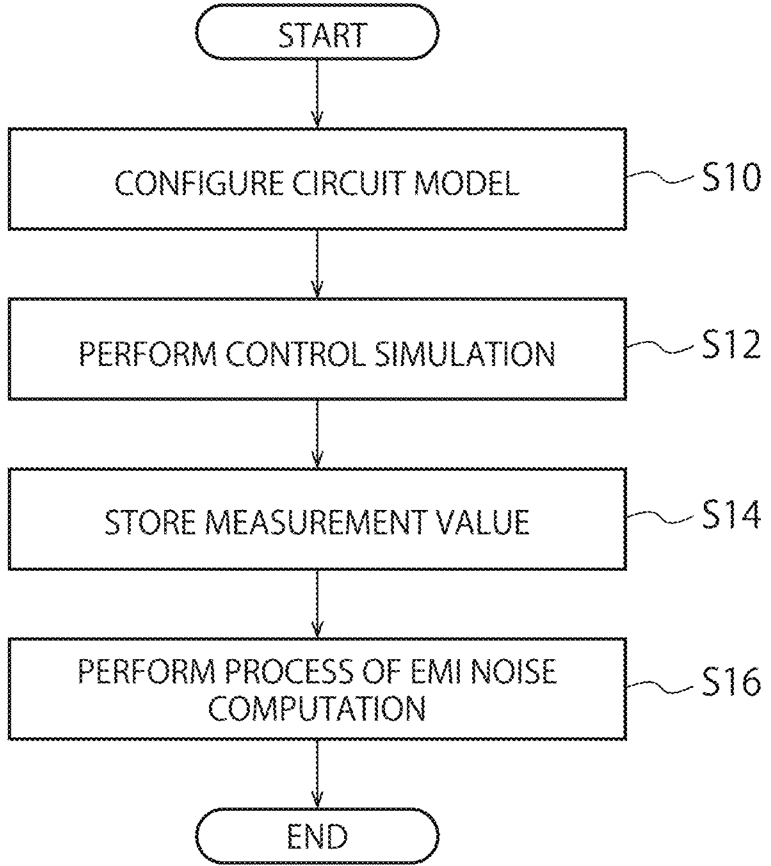
FIG. 11 is a flowchart illustrating an example of a computing process by the arithmetic device according to the first embodiment.

FIG. 11 is a flowchart illustrating an example of a computing process by the arithmetic device 1 according to the first embodiment. As illustrated in FIG. 11, the model generator 30 configures the model 80 in accordance with input information from the information input portion 10. Further, the model generator 30 configures the element models 88, the passive element models 89*a*, 89*b*, and 89*c*, and the motor model 90 in the model 80 in accordance with the input information (Step S10).

Next, the execution processor 40 controls the motor model 90 to achieve the rotation speed L10 illustrated in FIG. 9, for example, by using information on the model 80 configured as described above. The execution processor 40 computes currents and voltages of each element model 88 and wires in the model 80 in each calculating step (Step S12). The noise measurement portion 92 stores a voltage value over time at a predetermined measurement point in the storage 20 (Step S14). The noise measurement processor 94 then performs a frequency analysis process by the maximum-value holding method to compute an EMI noise level (f) (Step S16).

Figure 12:
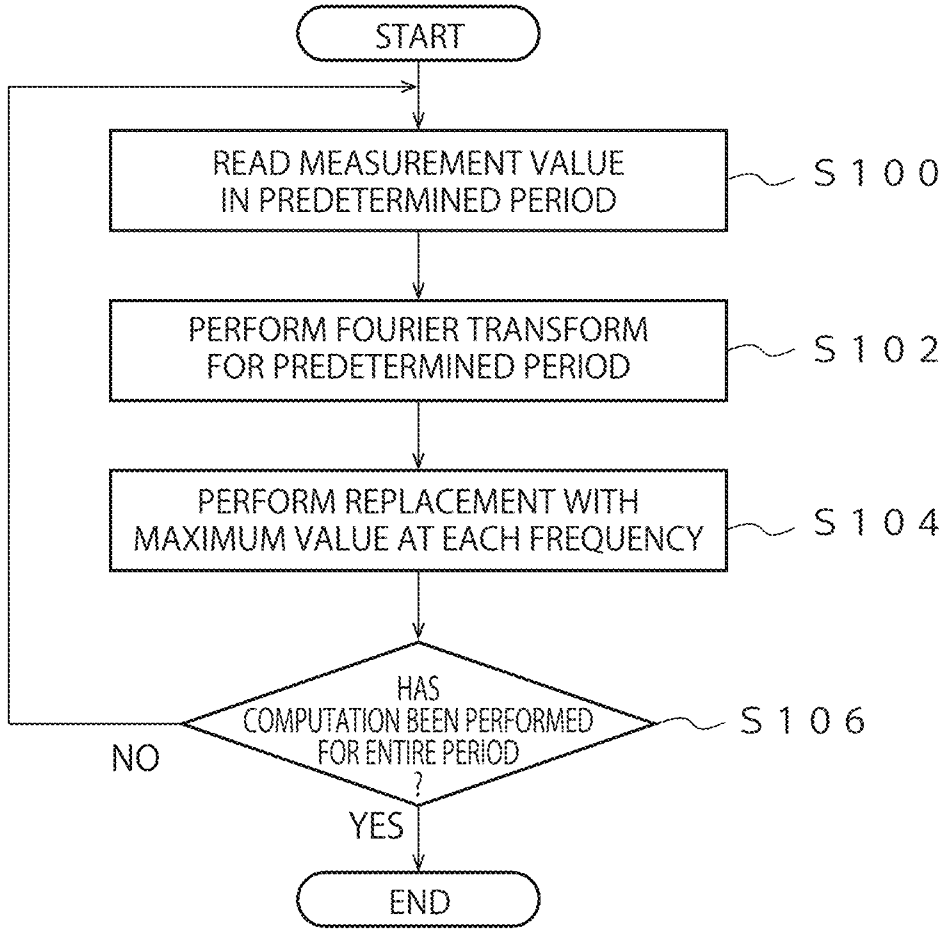
FIG. 12 is a flowchart illustrating an example of a computing process using a maximum-value holding method.

FIG. 12 is a flowchart illustrating an example of a computing process by the noise measurement processor 94 using the maximum-value holding method according to the present embodiment. As illustrated in FIG. 12, the noise measurement processor 94 reads voltage value data over time, for example, in a measurement time segment (a range of 30 microseconds) measured by the noise measurement portion 92 that is a predetermined measurement point stored in the storage 20, from the storage 20 (Step S100).

Next, the noise measurement processor 94 performs Fourier transform on the voltage value data over time in the measurement time segment, thereby computing an EMI noise level (f) (Step S102). Subsequently, the noise measurement processor 94 replaces a noise level at each frequency f with the maximum noise level measured so far, and stores the maximum value in the storage 20 (Step S104). An initial value of the noise level at each frequency f is set to, for example, 0.

Next, the noise measurement processor 94 determines whether the computation has been ended for the entire measurement range (e.g., a range of 500 milliseconds) (Step S106), and repeats the processes from Step S100 when determining that the computation has not been ended for the entire measurement range (N at Step S106). Meanwhile, when determining that the computation has been ended for the entire measurement range, the noise measurement processor 94 ends the entire process.

As described above, in the arithmetic device 1 according to the present embodiment, a voltage value over time at a predetermined measurement point in the model 80 including the element models 88, the passive element models 89*a*, 89*b*, and 89*c*, and the motor model 90 is computed in the entire measurement range (e.g., a range of 500 milliseconds), and the noise measurement processor 94 performs Fourier transform on voltage value data over time in a time range (e.g., a range of 30 microseconds) shorter than the entire measurement period to compute an EMI noise level (f), replaces the noise level at each frequency f with the maximum noise level measured so far, and stores the maximum noise level in the storage 20. By computing the EMI noise level (f) using the maximum-value holding method in this manner, the frequency-component characteristics can be obtained in each short time range, and the EMI noise level (f) in the entire measurement range can be brought close to an actual measurement value.

Second Embodiment

The arithmetic device 1 according to a second embodiment is different from the arithmetic device 1 according to the first embodiment in generating a noise table for the model 80 in advance and computing an EMI noise level (f) by the maximum-value holding method using the noise table. Differences between the arithmetic device 1 according to the second embodiment and the arithmetic device 1 according to the first embodiment are described below.

Figure 13:
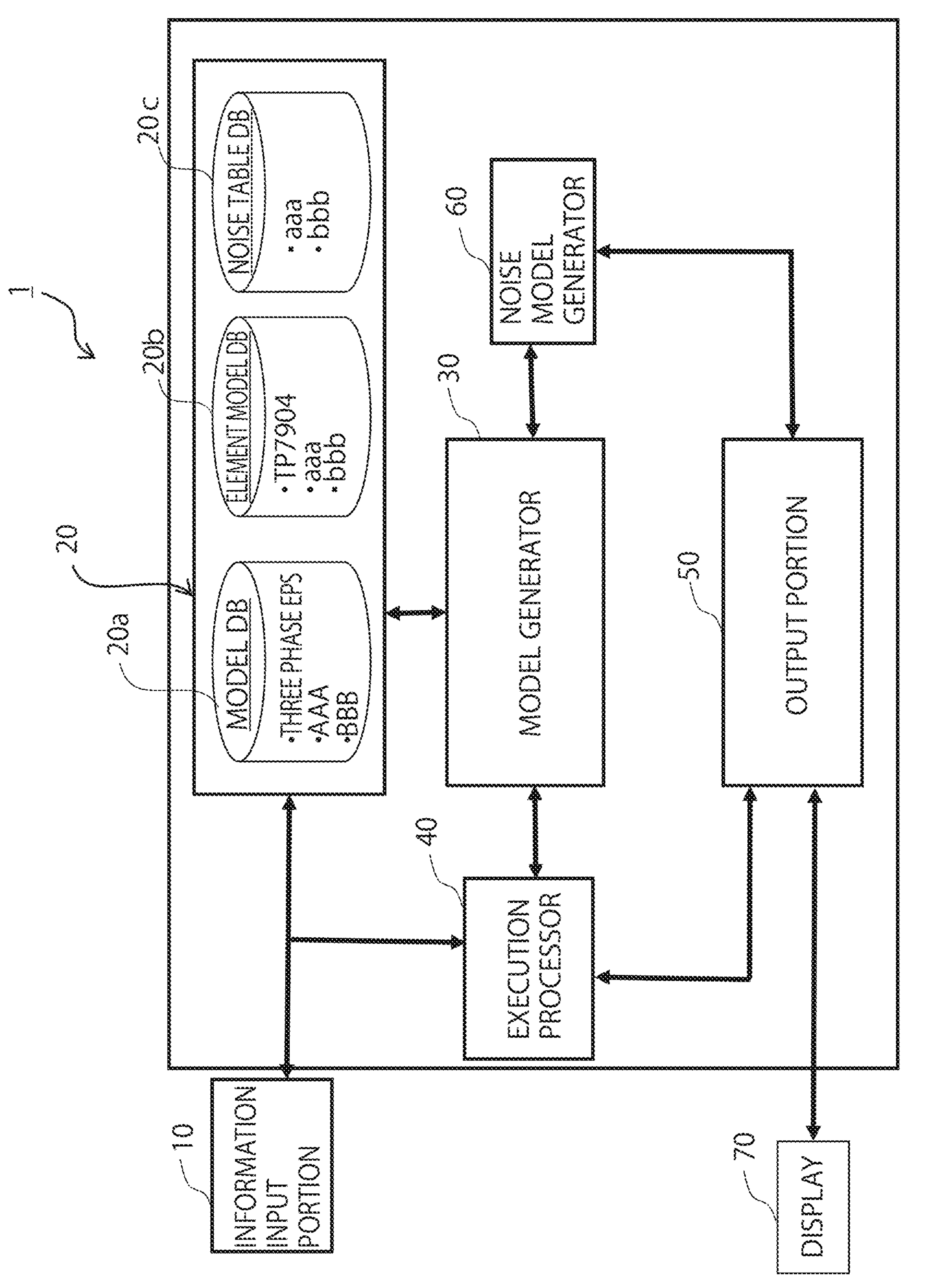
FIG. 13 is a block diagram illustrating a configuration of an arithmetic device according to a second embodiment.

FIG. 13 is a block diagram illustrating a configuration of the arithmetic device 1 according to the second embodiment. As illustrated in FIG. 13, the arithmetic device 1 according to the present embodiment further includes a noise model generator 60. The storage 20 further includes a noise table database 20*c* for storing therein a noise table generated by the noise model generator 60.

The arithmetic device 1 is also required to shorten a computation time. In operation simulation of a motor current of the motor model 90, for example, operation analysis can be performed in calculating steps of, for example, 100 nanoseconds (first calculating steps). However, frequency analysis of an EMI noise level (f) requires finer calculating steps for frequency analysis. In this case, operation simulation has to be performed in calculating steps of, for example, 2.5 nanoseconds (second calculating steps).

For this reason, when operation simulation accompanied by EMI noise analysis is performed, the required number of calculating steps is, for example, 40 times or more than that in motor current simulation. Therefore, in the arithmetic device 1 according to the present embodiment, the noise model generator 60 generates in advance a noise table of EMI noise levels (f) corresponding to motor current values at a predetermined point in calculating steps of, for example, 2.5 nanoseconds. In the entire measurement range, the noise measurement processor 94 computes the EMI noise level (f) by the maximum-value holding method in calculating steps of, for example, 100 nanoseconds by using the noise tables corresponding to motor current values. Details thereof will be described below.

Principle of Noise Table Generation

Figure 14:
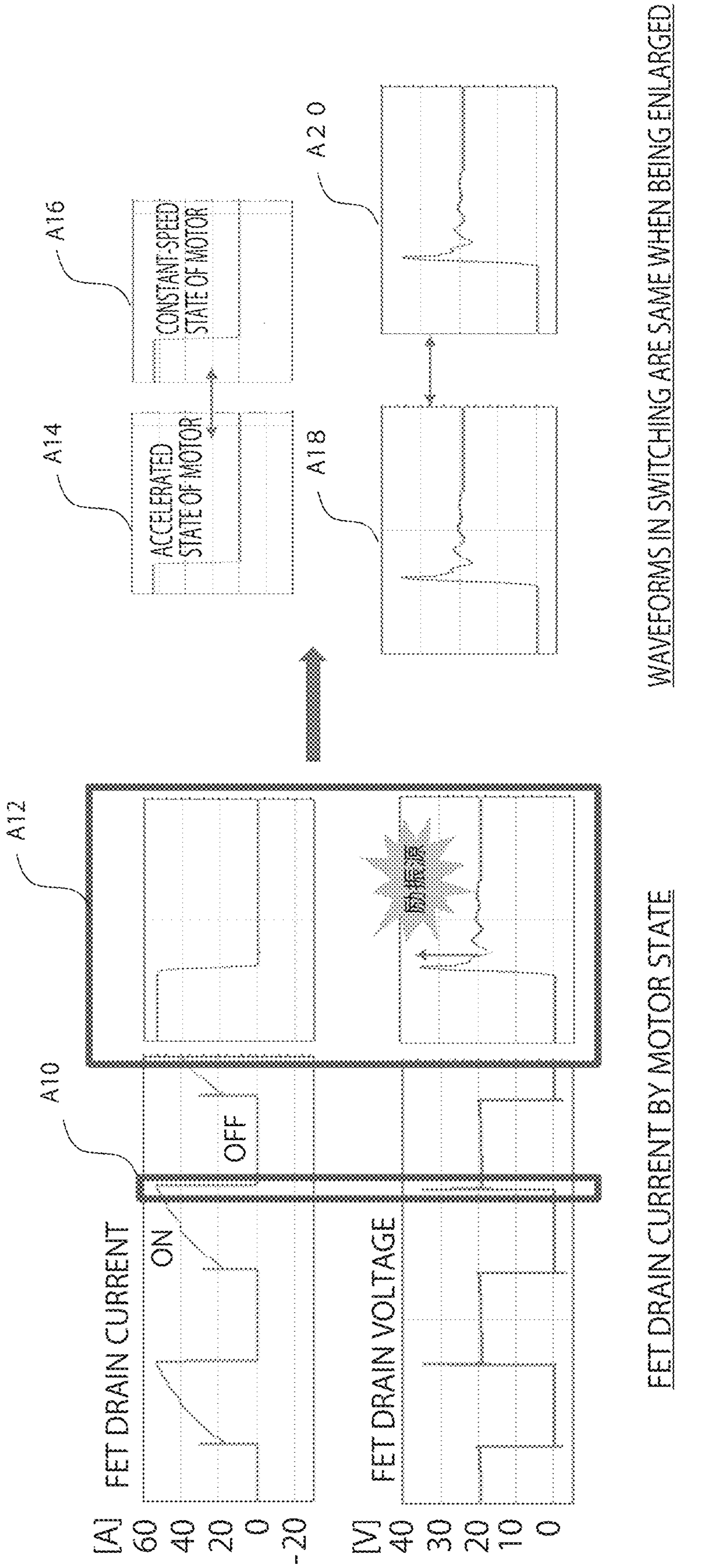
FIG. 14 is a diagram illustrating a relation between a drain current and a drain voltage in an operation.

Here, the principle of generation of a noise table by the noise model generator 60 is described with reference to FIGS. 14 and 15. FIG. 14 is a diagram illustrating a relation between a drain current and a drain voltage in a switching operation of the element model 88. The vertical axis represents a drain current and a drain voltage, and the horizontal axis represents a time. A region A12 is an enlarged view of a region A10 of the switching operation in which on is switched to off. As illustrated in the region A12, an excitation source is fluctuation of the drain voltage in the switching operation. This fluctuation of the drain voltage has a similar shape regardless of the magnitude of the drain current. Therefore, assuming that the characteristic impedance of a power supply system is Z, the drain current in the element model 88 of an FET is ΔI, a DC resistance in the power supply system is R, and an inductance component in the power supply system is L, for example, the drain voltage ΔV can be modelled as represented by Equation (2). The noise table generated by the noise model generator 60 can be generated at any measurement point. For example, in the present embodiment, the noise table is generated at a first measurement point, and noise at a second measurement point is generated by a transfer function, as will be described later. However, generation of the noise table and the noise is not limited thereto. For example, a noise table at the second measurement point may be generated. In this case, EMI noise can be generated by using the noise table without using the transfer function.

Regions A14 and A18 are enlarged views of the region A10 of the switching operation in which on is switched to off in an accelerated state. Regions A16 and A20 are enlarged views of the region A10 of the switching operation in which on is switched to off in a constant-speed state. As illustrated in the regions A14 to A20, the relation between the drain current and the drain voltage in the switching operation has similar shapes in the accelerated state and the constant-speed state of the motor model 90. As understood from the above description, when EMI noise caused by the drain voltage ΔV at a certain drain current ΔI has been measured, approximation of EMI noise then becomes possible by changing the magnitude of the measured EMI noise in accordance with the magnitude of the drain current ΔI. Further, the drain current ΔI is proportional to a motor current (see FIG. 4) of the motor model 90.

[Expression 2]

$$\Delta V = Z \times \Delta I \times \exp\left(-\frac{R}{2L}t\right) \tag{2}$$

Figure 15:
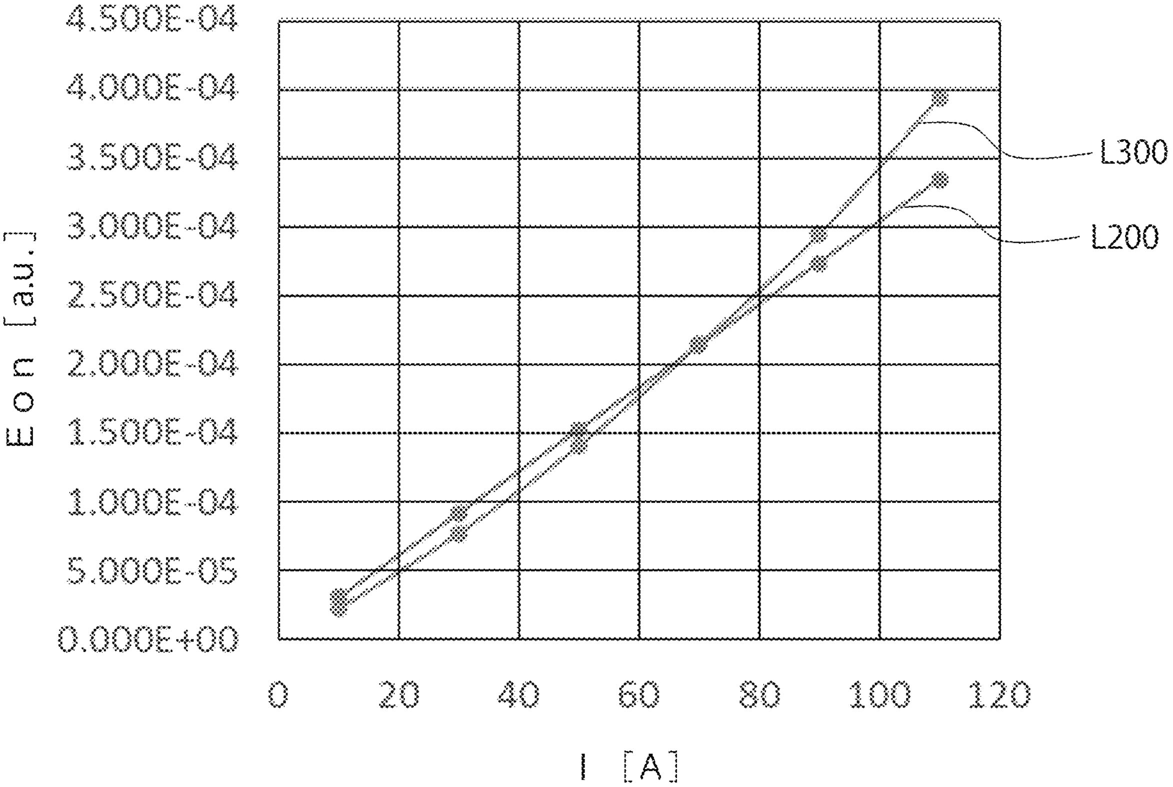
FIG. 15 is a diagram indicating a relation between a motor current and power of EMI noise.

FIG. 15 is a diagram illustrating simulation results indicating a relation between a motor current of the motor model 90 and the power of EMI noise. The vertical axis represents the power of EMI noise, and the horizontal axis represents a motor current. A line L200 indicates a result obtained by computation of the power of EMI noise at a predetermined measurement point in calculating steps of, for example, 2.5 nanoseconds. A line L300 will be described later. FIG. 15 shows that the power of EMI noise in the result of strict simulation in the calculating steps of, for example, 2.5 nanoseconds varies, for example, linearly relative to values of the motor current of the motor model 90.

Table Generating Process by Noise Model Generator

FIG. 16 is a table illustrating an example of an EMI table that is a noise table generated by the noise model generator 60. As illustrated in FIG. 16, the noise model generator 60 generates EMI tables for motor currents 10, 20, 30, . . . , 100 for every 10 amperes, for example. Since the power of EMI noise varies, for example, linearly relative to motor current values, it suffices that EMI noise values corresponding to, for example, two different values of the motor current are stored. However, due to heat loss or the like, nonlinearity may occur as indicated with the line L300. For this reason, tables for three or more values of the motor current, e.g., the motor currents 10, 20, 30, . . . , 100 for every 10 amperes may be generated. Accordingly, as for a system in which nonlinearity occurs, nonlinear interpolation using a quadratic function can be used instead of linear interpolation.

More specifically, the arithmetic device 1 according to the present embodiment simulates a voltage value over time at the predetermined first measurement point using control values providing the predetermined motor currents 10, 20, 30, . . . , 100. That is, the arithmetic device 1 simulates a voltage value over time at the first measurement point in calculating steps of, for example, 2.5 nanoseconds and stores the simulated voltage value in the storage 20. The first measurement point according to the present embodiment is, for example, an input end of the plurality of element models 88.

The noise model generator 60 then computes an EMI noise level (f) at each frequency f with respect to the voltage value over time in a predetermined period for each of the predetermined motor currents 10, 20, 30, . . . , 100 stored in the storage 20. In addition, the noise model generator 60 stores the EMI noise levels (f) for each of the predetermined motor currents 10, 20, 30, . . . , 100 in the noise table database 20*c* of the storage 20 as an EMI table. As described above, when frequency analysis is strictly performed, calculating steps of, for example, 2.5 nanoseconds are required. The EMI table according to the present embodiment corresponds to a table.

Transfer Function Generating Process by Noise Model Generator

Figure 17:
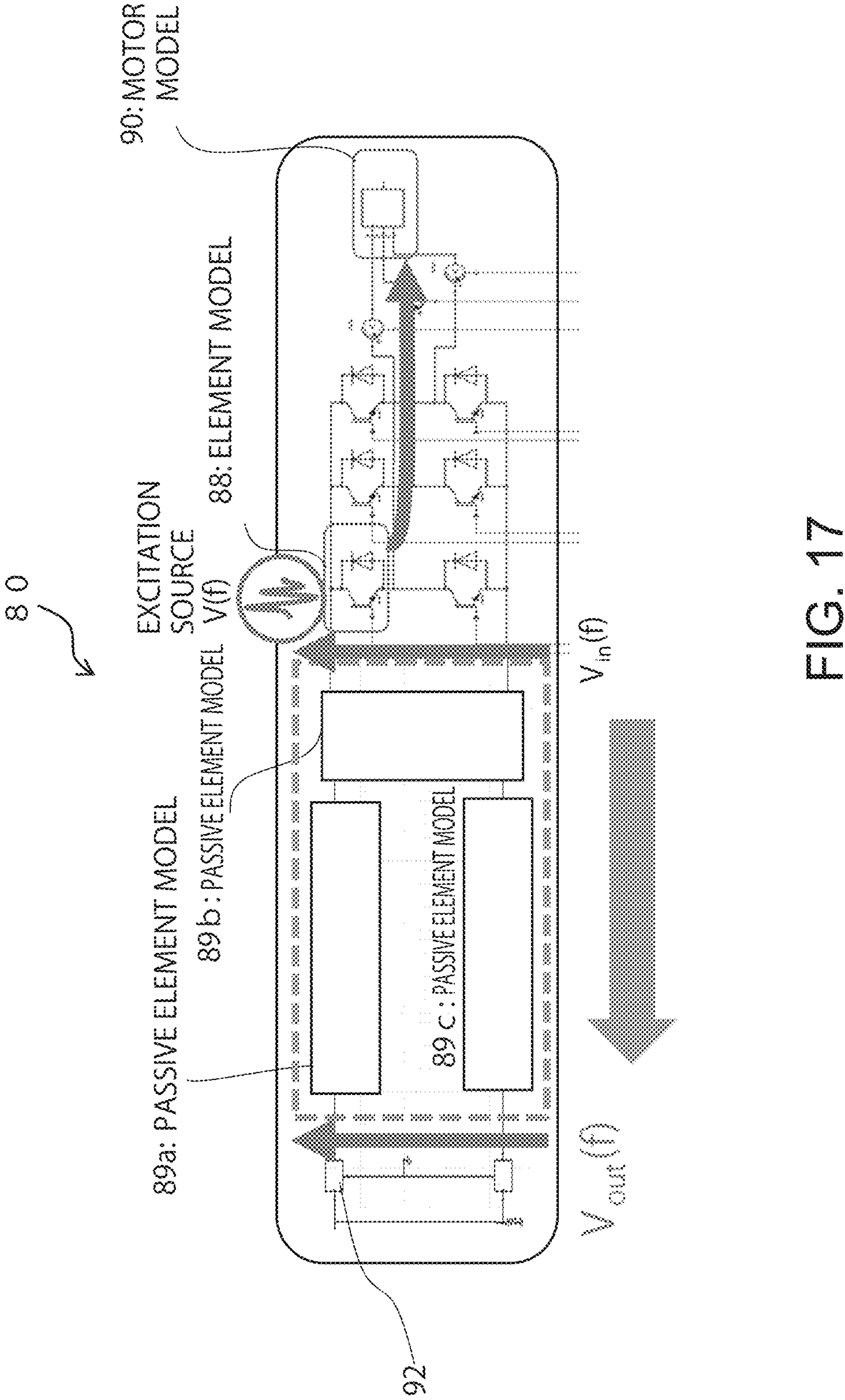
FIG. 17 is a diagram schematically illustrating an example of generating a transfer function H(f) at each frequency f.

FIG. 17 is a diagram schematically illustrating an example of generating a transfer function H(f) at each frequency by the noise model generator 60. The noise model generator 60 simulates a voltage Vin at an input end of the plurality of element models 88, which is the predetermined first measurement point, and a voltage Vout at the predetermined second measurement point by using control values providing the predetermined motor currents 10, 20, 30, . . . , 100. That is, the arithmetic device 1 simulates the voltage Vin at the predetermined first measurement point and the voltage Vout at the predetermined second measurement point in calculating steps of, for example, 2.5 nanoseconds and stores them in the storage 20 to be associated with each other over time.

Accordingly, for example, the noise measurement portion 92 (see FIG. 4) can be arranged at the input end of the plurality of element models 88 and generate an EMI noise level (f) at the second measurement point. Meanwhile, the noise measurement portion 92 (see FIG. 4) can also be arranged at the second measurement point, as in the first embodiment. In this case, the EMI noise level (f) at the second measurement point can be generated without using the transfer function H(f). As described above, the EMI noise level (f) at any second measurement point can be generated by arranging the noise measurement portion 92 (see FIG. 4) at the predetermined first measurement point and using the transfer function H(f).

[Expression 3]

$$H(f) = \frac{\mathrm{V\,out}(f)}{\mathrm{V\,in}(f)} \tag{3}$$

The noise model generator 60 performs frequency analysis of the transfer function H(f) obtained by dividing a voltage Vout(f) at the second measurement point by a voltage Vin(f) at the input end as the first measurement point, as represented by Expression (3), generates the transfer function H(f) at each frequency, and stores it in the storage 20.

Figure 18:
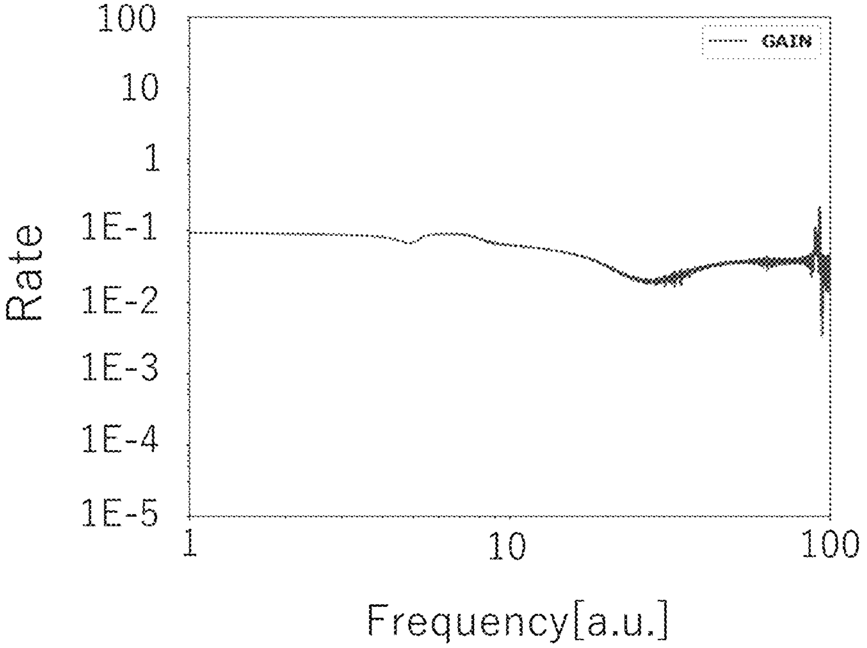
FIG. 18 is a diagram illustrating an example of a transfer function H(f)

FIG. 18 is a diagram illustrating an example of the transfer function H(f) generated by the noise model generator 60. The horizontal axis represents a frequency, and the vertical axis represents a value of a transfer function by a rate (Rate) of the voltage $V_{in}$ and the voltage $V_{out}$.

Process by Noise Measurement Processor

Figure 19:
FIG. 19 is a diagram schematically illustrating a process example of generating an EMI noise level (f)

FIG. 19 is a diagram schematically illustrating a process example of generating an EMI noise level (f) using EMI tables. The noise measurement processor 94 generates an EMI noise level (f) by using EMI tables obtained by preliminary measurement performed in advance. The noise measurement processor 94 generates the EMI noise level (f) in accordance with a motor current value by using the EMI tables. In this case, when a motor current value not included in the EMI tables is supplied, the noise measurement processor 94 generates the EMI noise level (f) by linear interpolation using the existing EMI tables.

For example, when there are an EMI table (50) for a motor current of 50 amperes and an EMI table (60) for a motor current of 60 amperes, the noise measurement processor 94 generates an EMI table corresponding to a motor current of, for example, 53 amperes by interpolation between the EMI table (50) and the EMI table (60). In this case, the noise measurement processor 94 performs linear interpolation when the EMI noise level (f) linearly varies, and performs nonlinear interpolation when the EMI noise level (f) nonlinearly varies. The noise measurement processor 94 then multiplies the EMI table corresponding to the motor current by the transfer function H (f) to generate an EMI noise level (f) at the second measurement point as an EMI prediction value. In a case where the noise measurement portion 92 (see FIG. 4) is arranged at the second measurement point as in the first embodiment, using EMI tables at the second measurement point makes the transfer function (f) unnecessary.

Figure 20:
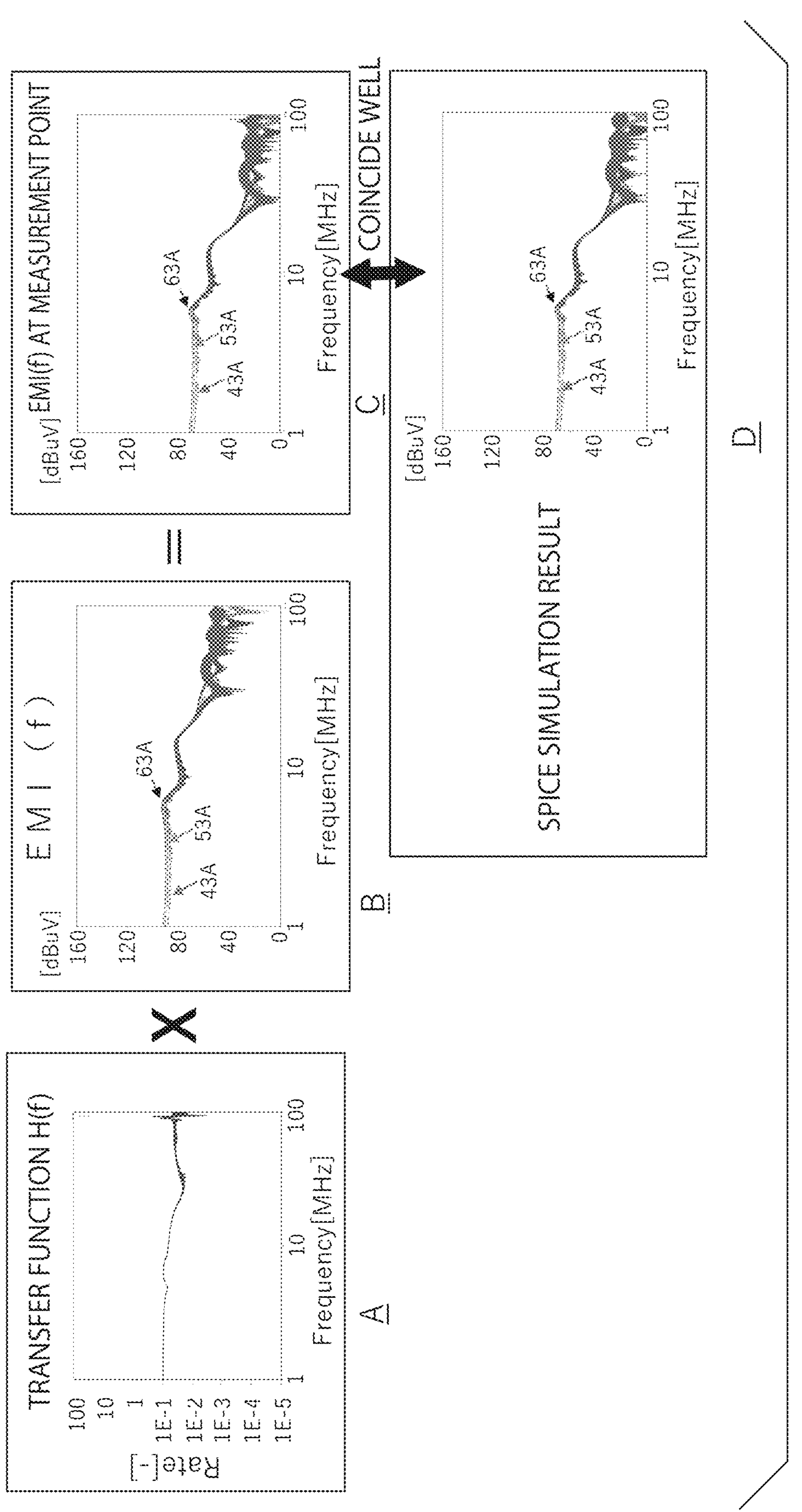
FIG. 20 includes diagrams schematically illustrating a process example by the noise measurement processor.

FIG. 20 includes diagrams schematically illustrating a process example by the noise measurement processor 94. Diagram A illustrates a transfer function H(f) at each frequency f generated by the noise model generator 60. Diagram B illustrates EMI noise levels (f) at the first measurement point at 43, 53, and 63 amperes generated by the noise measurement processor 94 through interpolation using the EMI tables illustrated in FIG. 16. Diagram C illustrates EMI noise levels (f) at the second measurement point. As illustrated in these diagrams, the noise model generator 60 multiplies the EMI noise level (f) at the first measurement point by the transfer function H(f) to generate the EMI noise level (f) at the second measurement point. Diagram D illustrates the EMI noise levels (f) at the second measurement point when a transient phenomenon is strictly simulated in calculating steps of 2.5 nanoseconds. The EMI noise levels (f) at the second measurement point in Diagram C and the EMI noise levels (f) at the second measurement point in Diagram D obtained by strict simulation coincide well with each other. As described above, the EMI noise level (f) generated by the noise measurement processor 94 through interpolation using the EMI tables has a value equivalent to that of the EMI noise level (f) obtained by strict simulation of the transient phenomenon in the calculating steps of 2.5 nanoseconds. That is, by using the EMI tables, the noise measurement processor 94 can generate the EMI noise level (f) at the second measurement point in accordance with a motor current with the accuracy of the EMI noise level (f) maintained.

Figure 21:
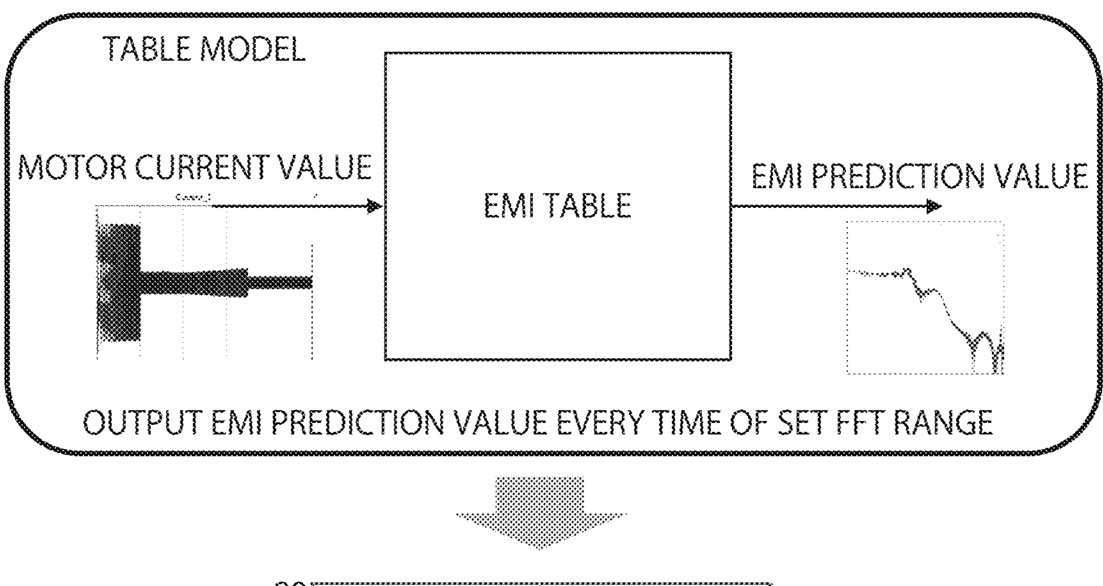
FIG. 21 is a diagram schematically illustrating a process example by the noise measurement processor using a control value.
Figure 21:
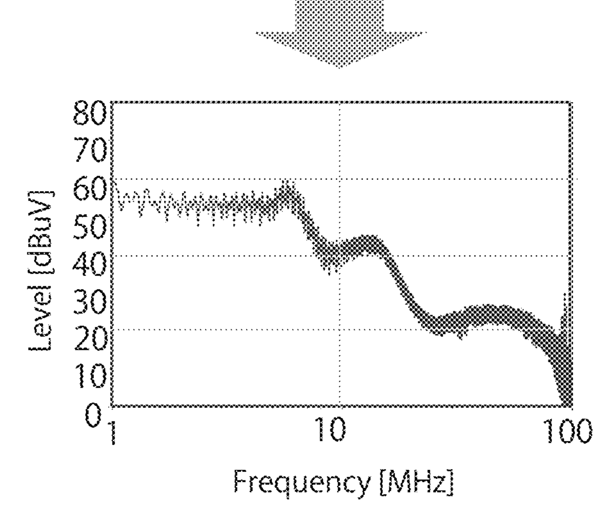

FIG. 21 is a diagram schematically illustrating a process example by the noise measurement processor 94 using a control value. As in the first embodiment, the noise measurement processor 94 according to the present embodiment generates an EMI noise level (f) in accordance with a value of a motor current based on EMI tables in each calculating step of, for example, 30 microseconds and replaces the generated noise level with the maximum noise level at each frequency by using the maximum-value holding method. That is, the noise measurement processor 94 generates an EMI noise level (f) in each time segment (e.g., 30 microseconds) in accordance with a motor current in each time segment. In this way, the noise measurement processor 94 generates the EMI noise level (f) in each time segment based on EMI tables in each of which an EMI noise level (f) at each frequency corresponding to a motor current is recorded. As the motor current in each time segment (e.g., 30 microseconds), a representative value of the motor current in each time segment (e.g., 30 microseconds) can be used. Examples of the representative value of the motor current include an average value and an intermediate value of the motor current in each time segment.

As illustrated in FIG. 21, when a motor current value obtained in a calculating step of 100 nanoseconds is given over time, the noise measurement processor 94 generates an EMI noise level (f) at the first measurement point which corresponds to the motor current value, for example, every 30 microseconds and multiplies that EMI noise level (f) by the transfer function H(f) to generate an EMI noise level (f) at the second measurement point as an EMI noise prediction value. The noise measurement processor 94 then replaces the noise level at each frequency f with the maximum noise level measured so far and stores the maximum value in the storage 20. This process is repeated every 30 microseconds over the entire range of the motor current values. Accordingly, the output result in the maximum-value holding method is stored in the storage 20. In a case where the voltage Vout at the second measurement point is simulated and its voltage waveform is subjected to frequency analysis to generate an EMI table, the transfer function H(f) is not necessary, as described above. In this case, the EMI noise level (f) at the second measurement point corresponding to the motor current value can directly be computed using the EMI table.

As described above, using EMI tables makes it possible to generate an EMI noise level (f) in accordance with a motor current value without depending on calculating steps. As a result, in a case of generating the EMI noise level (f) that is EMI noise in an actual machine, it suffices that the EMI noise level (f) is generated in calculating steps of, for example, 30 microseconds using a motor current value obtained in calculating steps of 100 nanoseconds. Therefore, a computation time can be largely reduced with the computation accuracy maintained.

Figure 22:
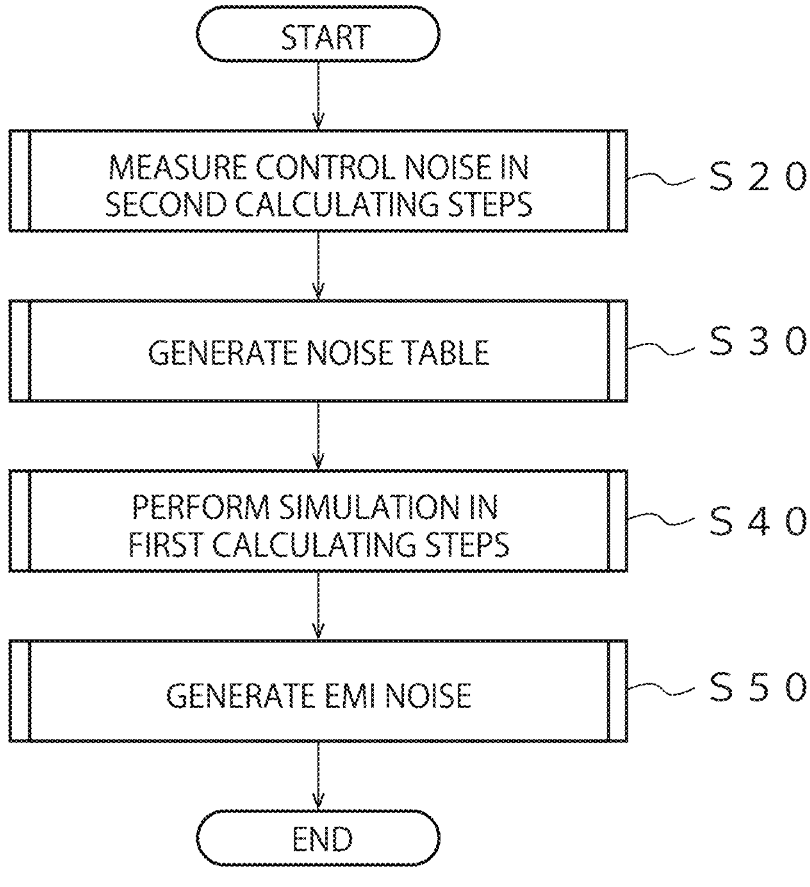
FIG. 22 is a flowchart of an example of a computing process by the arithmetic device according to the second embodiment.

FIG. 22 is a flowchart of an example of a computing process by the arithmetic device 1 according to the second embodiment. As illustrated in FIG. 22, the model generator 30 configures the model 80 in accordance with input information from the information input portion 10. In this case, the execution processor 40 carries out simulation in accordance with a control value of a simple model in which a motor current monotonically increases, for example, as illustrated in FIG. 4 by using information on the model 80 configured as described above.

The execution processor 40 computes currents and voltages of each element model 88 and wires in the model 80 in each calculating step of, for example, 2.5 nanoseconds (the second calculating step) and stores a voltage value over time at the predetermined first measurement point in the storage 20 (Step S20). As described above, at Step S20, using information on the electrical characteristics of each element model 88, a preliminary process is performed which computes a voltage value at the measurement point generated in each second calculating step (2.5 nanoseconds) shorter than the first calculating step (100 nanoseconds) by switching of the element model 88 and a motor current over time, with respect to a second input value (for example, a control value of a simple model) over time in a predetermined period. When the transfer function H(f) is not used, the voltage value at the second measurement point is stored over time.

Next, the noise model generator 60 generates EMI tables, for example, for every 10 amperes and a transfer function H(f) by using the measured voltage value at the first measurement point over time, and stores them in the storage 20 (Step S30). As described above, at Step S30, a plurality of tables corresponding to a plurality of predetermined values of the motor current (e.g., current values for every 10 amperes) are generated. That is, a table generating process is performed which performs frequency analysis for a voltage value over time in a predetermined period (e.g., 30 microseconds) at the predetermined values of the motor current (e.g., current values for every 10 amperes) to generate EMI tables in which EMI noise levels (f) at respective frequencies are recorded, to correspond to the predetermined values of the motor current. In a case of not using the transfer function H(f), it is possible to generate the EMI tables, for example, for every 10 amperes by using a measured voltage value over time at the second measurement point and store them in the storage 20.

Next, the execution processor 40 connects a load of a detailed model, for example, a steering wheel of an automobile to the motor model 90, generates a motor current in an actual operation of the motor model 90 in each calculating step of 100 nanoseconds (first calculating step) through simulation, and stores the simulation result in the storage 20 as a motor current waveform in the actual operation (Step S40). The motor current waveform corresponds to a value of the motor current over time.

The noise measurement processor 94 then generates an EMI noise level (f) at the first measurement point corresponding to the motor current value in the actual operation, for example, every 30 microseconds by using the EMI tables and multiplies that EMI noise level (f) by the transfer function H(f) to generate an EMI noise level (f) at the second measurement point as an EMI prediction value. Every time the noise measurement processor 94 generates the EMI prediction value, the noise measurement processor 94 replaces the noise level at each frequency f with the maximum noise level measured so far, stores the maximum noise level in the storage 20 (Step S50), and ends the entire computing process.

Figure 23:
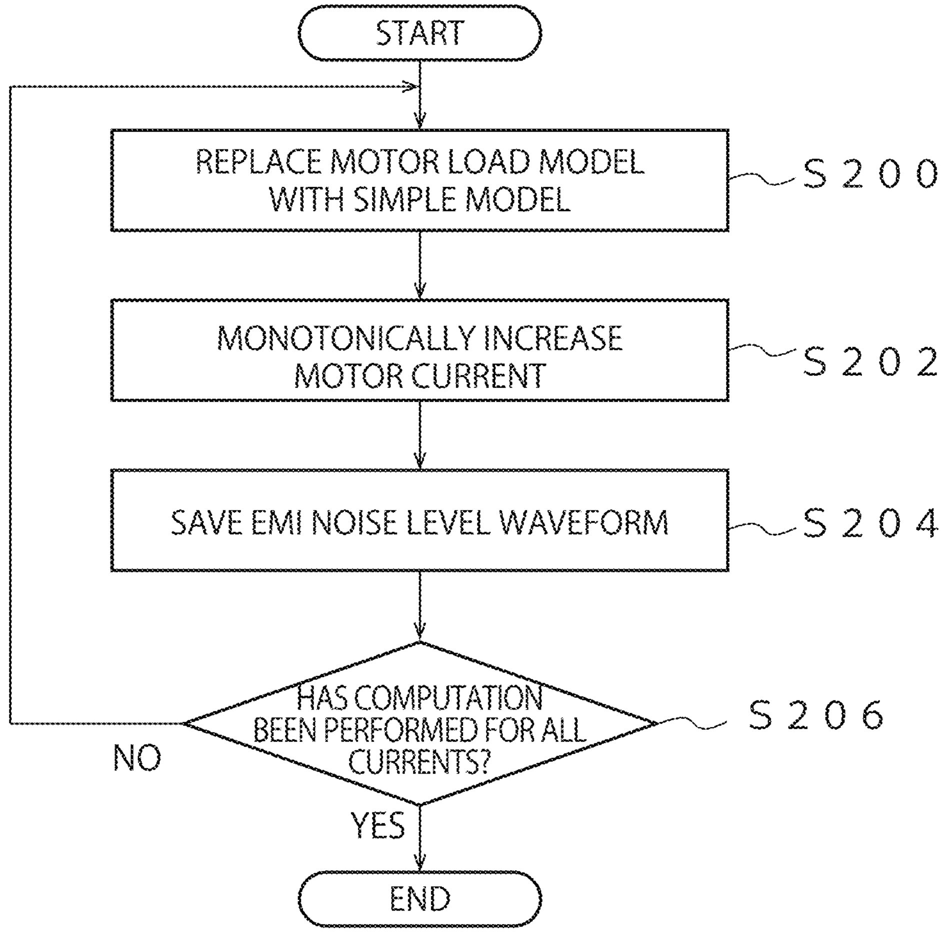
FIG. 23 is a flowchart of a detailed example of the computing process at Step S20.

FIG. 23 is a flowchart of a detailed example of the computing process at Step S20. As illustrated in FIG. 23, the execution processor 40 replaces a load and a control value of the motor model 90 in the model 80 with a simple model for preliminary measurement in which a motor current monotonically increases as illustrated in FIG. 4 (step S200).

The execution processor 40 then computes currents and voltages of each element model 88 and wires in the model 80, for example, every 10 amperes by using a control value of the simple model (Step S202) and stores a voltage value over time at the first measurement point in the storage 20 (See FIG. 1) as an EMI noise level waveform (Step S204). In this case, the execution processor 40 computes currents and voltages of each element model 88 and wires in the model 80 in each calculating step of 2.5 nanoseconds.

Next, the execution processor 40 determines whether the computing process has been ended for all currents (Step S206). When determining that the computing process has not been ended (N at Step S206), the execution processor 40 repeats the processes from Step S202. Meanwhile, when determining that the computing process has been ended (Y at Step S206), the execution processor 40 ends the process of noise preliminary measurement.

Figure 24:
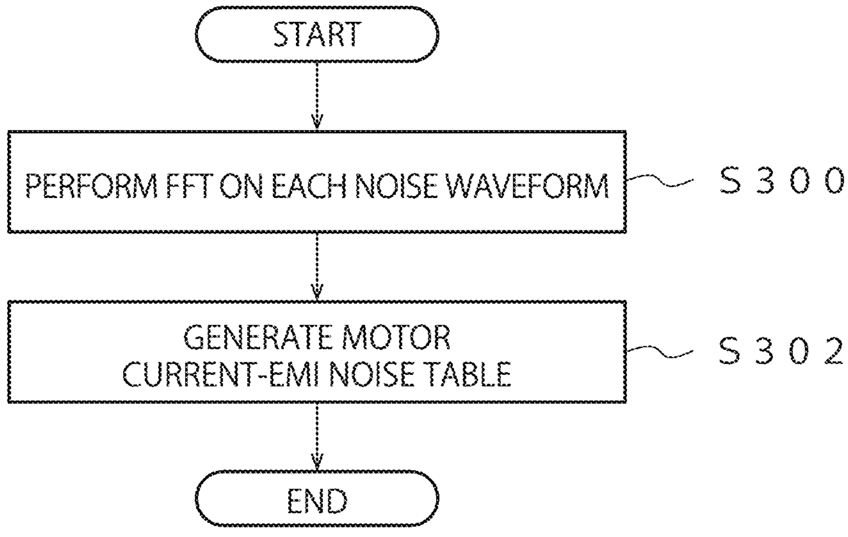
FIG. 24 is a flowchart of a detailed example of the computing process at Step S30.

FIG. 24 is a flowchart of a detailed example of the computing process at Step S30. As illustrated in FIG. 24, the noise model generator 60 computes Fourier transform of an EMI noise level waveform at the first measurement point stored in the storage 20, for example, every 10 amperes of motor current (Step S300).

Further, the noise model generator 60 computes a transfer function H(f) at this time. The noise model generator 60 then stores EMI tables for every 10 amperes of motor current and the transfer function H(f) in the noise table database 20*c* of the storage 20 (Step S302). When the transfer function H(f) is not used, it is not necessary to compute the transfer function H(f), as described above.

Figure 25:
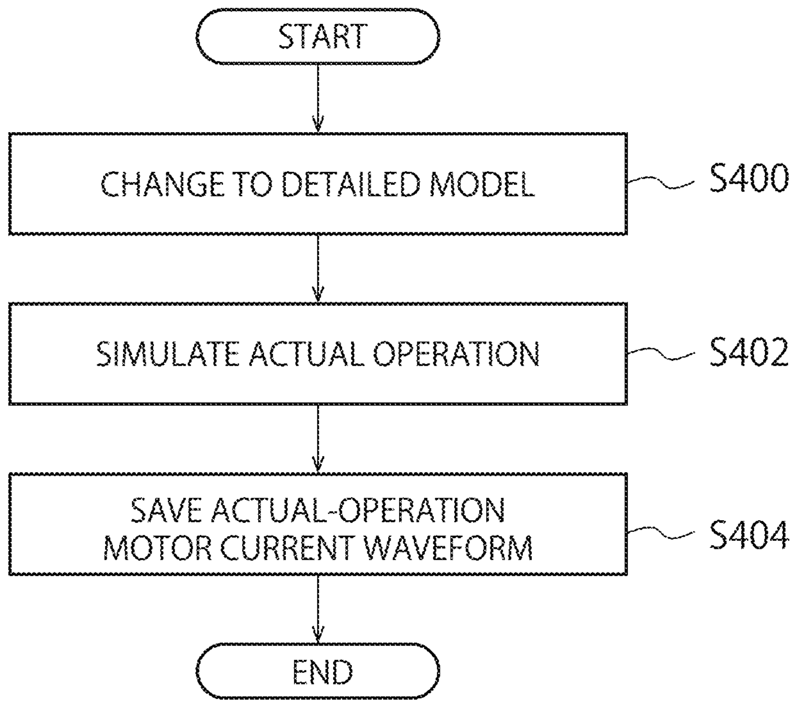
FIG. 25 is a flowchart of a detailed example of the computing process at Step S40.

FIG. 25 is a flowchart of a detailed example of the computing process at Step S40. As illustrated in FIG. 25, the execution processor 40 connects a detailed load model, for example, a steering wheel of an automobile to the motor model 90 (Step S400).

Next, the execution processor 40 simulates a motor current in accordance with a control value that causes generation of a target torque of the motor model 90 (Step S402). In this case, the execution processor 40 simulates currents and voltages of each element model 88 and wires in the model 80 and a motor current in an actual operation in the motor model 90 in each calculating step of 100 nanoseconds (Step S404). A motor current waveform in the actual operation of the motor model 90 is stored in the storage 20 as described above. The motor current waveform corresponds to a value of the motor current over time.

Figure 26:
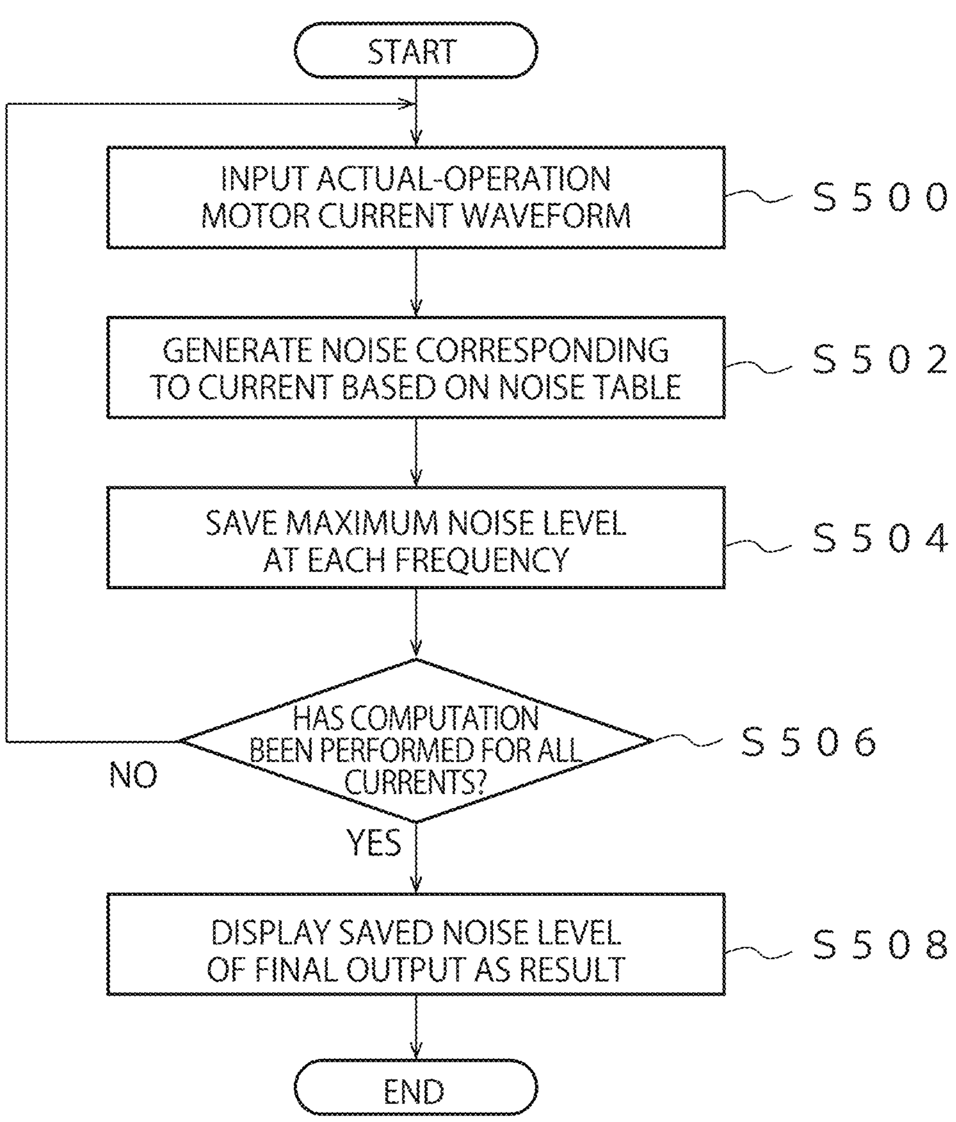
FIG. 26 is a flowchart of a detailed example of the computing process at Step S50.

FIG. 26 is a flowchart of a detailed example of the computing process at Step S50. As illustrated in FIG. 26, the noise measurement processor 94 reads an actual-operation motor current waveform (step S500).

The noise measurement processor 94 then generates an EMI noise level (f) at the first measurement point corresponding to a motor current value in the actual operation, for example, every 30 microseconds by using EMI tables. When there is no EMI table corresponding to the motor current value, the noise measurement processor 94 generates an EMI noise level (f) in each time segment by interpolation using EMI noise levels (f) at frequencies recorded in the EMI tables.

Subsequently, the noise measurement processor 94 multiplies the EMI noise level (f) at the first measurement point by a transfer function H(f) to generate an EMI noise level (f) at the second measurement point as an EMI prediction value (Step S502). When the EMI tables at the second measurement point are used, it is allowable that multiplication by the transfer function H(f) is not performed, as described above.

Next, every time the noise measurement processor 94 generates the EMI prediction value, the noise measurement processor 94 replaces a noise level at each frequency with the maximum noise level measured so far and stores the maximum noise level in the storage 20 (Step S504). Next, the noise measurement processor 94 determines whether the computing process has been ended for all motor currents in the actual operation (Step S506). When determining that the computing process has not been ended (N at Step S506), the noise measurement processor 94 repeats the processes from Step S502. Meanwhile, when determining that the computing process has been ended (Y at Step S506), the noise measurement processor 94 causes the display 70 to display the EMI noise finally stored in the storage 20 via the output portion 50 (see FIG. 1) (Step S508).

As described above, according to the present embodiment, the noise model generator 60 computes EMI noise levels (f) at each frequency f with respect to voltage values over time at a measurement point at a plurality of motor currents, thereby generating EMI tables respectively corresponding to the motor currents. Since the EMI noise level (f) varies according to the motor current in accordance with a predetermined rule, the noise measurement processor 94 can compute an EMI noise level (f) according to the motor current using the plural EMI tables. Therefore, when a value of the motor current is input, the EMI noise level (f) can be computed without depending on calculating steps.

Third Embodiment

The arithmetic device 1 according to a third embodiment is different from the arithmetic device 1 according to the second embodiment in being able to further generate a thermal model that generates a temperature value and a mechanical model that performs a mechanical operation. Differences between the arithmetic device 1 according to the third embodiment and the arithmetic device 1 according to the second embodiment are described below.

Figure 27:
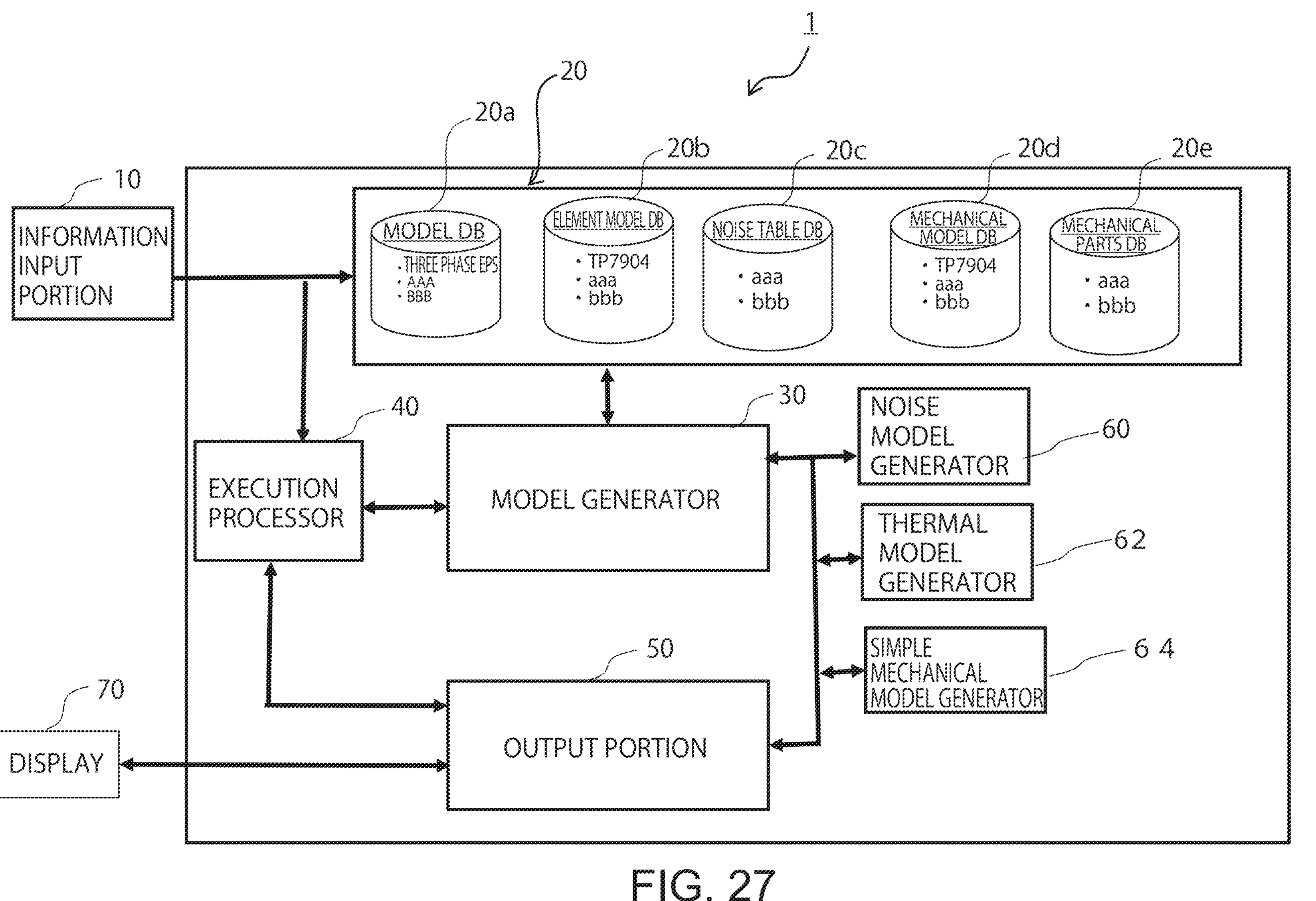
FIG. 27 is a block diagram illustrating a configuration of an arithmetic device according to a third embodiment.

FIG. 27 is a block diagram illustrating a configuration of the arithmetic device 1 according to the third embodiment. As illustrated in FIG. 27, the arithmetic device 1 according to the present embodiment can generate a thermal model and a mechanical model. More specifically, the arithmetic device 1 further includes a thermal model generator 62 and a simple mechanical model generator 64. In addition, the storage 20 further includes a mechanical model database 20*d* and a mechanical parts database 20*e*. The element model database 20*b* further stores therein a simple element model 88*a* that is obtained by simplifying the element model 88.

Figure 28A:
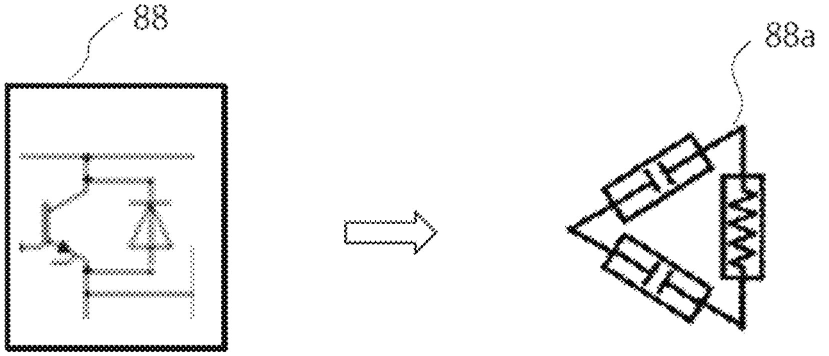
FIG. 28A is a diagram illustrating an example of a simple model obtained by simplifying an element model.

FIG. 28A is a diagram illustrating an example of the simple element model 88*a* obtained by simplifying the element model 88. A MOSFET that is an example of an active element, for example, can be represented by a combination of passive elements, when being approximated by a larger time constant. Therefore, the simple element model 88*a* is configured by a switch model having information on a resistance value of an element.

The temperature of the element model 88 changes with an integrated value of generated power. Therefore, simulation of the temperature characteristics of an active element such as a MOSFET is performed by computing the generated power generated in accordance with a switching timing.

Meanwhile, a time constant of the temperature change is larger than a time constant of the active element. Therefore, in the temperature characteristics simulation, there is a tendency that the temperature characteristics depend on the integrated value of the spike-like generated power but do not depend on the shape of the generated power. Focusing on such characteristics, the thermal model generator 62 according to the present embodiment generates a thermal model corresponding to the generated power of the element model 88 that is a high-accuracy model.

FIG. 28B is a table illustrating an example of a thermal table used by a thermal model. As illustrated in FIG. 28B, the thermal model generator 62 generates a thermal table corresponding to motor currents for each of a conducting state (Turn-on) and a non-conducting state (Turn-off) of the element model 88.

That is, the thermal model generator 62 strictly simulates generated power for each of motor current values 10, 20, 30, . . . , 100 amperes of the motor model 90 with a high-accuracy model of the element model 88 with regard to the conducting state (Turn-on) and the non-conducting state (Turn-off) in each calculating step of 2.5 nanoseconds (second calculating step). Next, the thermal model generator 62 computes an integrated value of the generated power for each of the conducting state (Turn-on) and the non-conducting state (Turn-off), and determines a representative value that is in proportion to the integrated value. For example, a value obtained by dividing the integrated value by a predetermined time is computed as the representative value. Alternatively, the integrated value itself is used as the representative value. As illustrated in FIG. 28B, these representative values are recorded in the thermal tables and become table values in the conductive state (Turn-on) and the non-conductive state (Turn-off). As described above, the thermal model generator 62 generates a thermal model that outputs, in accordance with switching of the element model 88, an output value based on an integrated value obtained by integrating power generated in each calculating step of 2.5 nanoseconds (the second calculating step). In addition, the thermal model generator 62 records a value obtained by dividing the integrated value in each of the conducting state and the non-conducting state of the element model 88 by a predetermined time or the integrated value in a thermal table as a representative value in each of the conducting state and the non-conducting state of the element model.

These representative values vary, for example, nonlinearly as indicated by the line L300 in FIG. 15. A thermal measurement processor 93 (see FIG. 29) described later interpolates table values in the conducting state (Turn-on) and the non-conducting state (Turn-off) (see FIG. 28B) by nonlinear interpolation using, for example, a quadratic function, thereby generating a temperature value.

As described above, in the thermal model, a temperature value in accordance with a motor current is output by computation using thermal tables in which a representative value is recorded. As a result, in the temperature characteristic simulation, the thermal measurement processor 93 generates a temperature value over time in a measurement period based on the thermal tables corresponding to the motor current, in place of strict simulation of an active element in calculating steps of 2.5 nanoseconds (second calculating steps). As described above, the thermal measurement processor 93 computes the temperature value in each calculating step of 100 nanoseconds (first calculating step) of the element model 88 over time by using an output value generated in each of the conducting state and the non-conducting state of the element model 88 using the thermal tables. As understood from the above description, using the thermal models makes it possible to output the integrated value of the generated power equivalent to that in the high-precision model at higher speed in accordance with the motor current.

The mechanical model database 20*d* stores therein information on a plurality of mechanical models 96. The mechanical parts database 20*e* stores therein information on mechanical parts in the mechanical model 96. Accordingly, the model generator 30 can generate the mechanical model 96 that operates in cooperation with the circuit model 82, for example, in accordance with input from the information input portion 10. Further, the model generator 30 can replace mechanical parts 98 in the mechanical model 96 in accordance with input from the information input portion 10. The mechanical parts 98 are, for example, gear, steering wheels, or tires.

The simple mechanical model generator 64 generates a simple model related to the mechanical model 96. For example, a motor torque 700*g* of the motor model 90 over time and a command value 700*b* that causes generation of the motor torque 700*g* are simple models related to the mechanical model 96. Time constants of the circuit model 82 and the mechanical model 96 are largely different from each other and, when the element model 88 that is a high-accuracy model of the circuit model 82 is used for simulation of the mechanical model 96, an unrealistic calculation time is taken. Therefore, in simulation of the mechanical model 96, the simple model 88*a* is used. Meanwhile, simulation of the circuit model 82 is performed by using a simple mechanical model that simply represents an operation of the mechanical model 96, for example, the motor torque 700*g* over time and the command value 700*b* that causes generation of the motor torque 700*g*, while the mechanical model 96 is separated.

Figure 29:
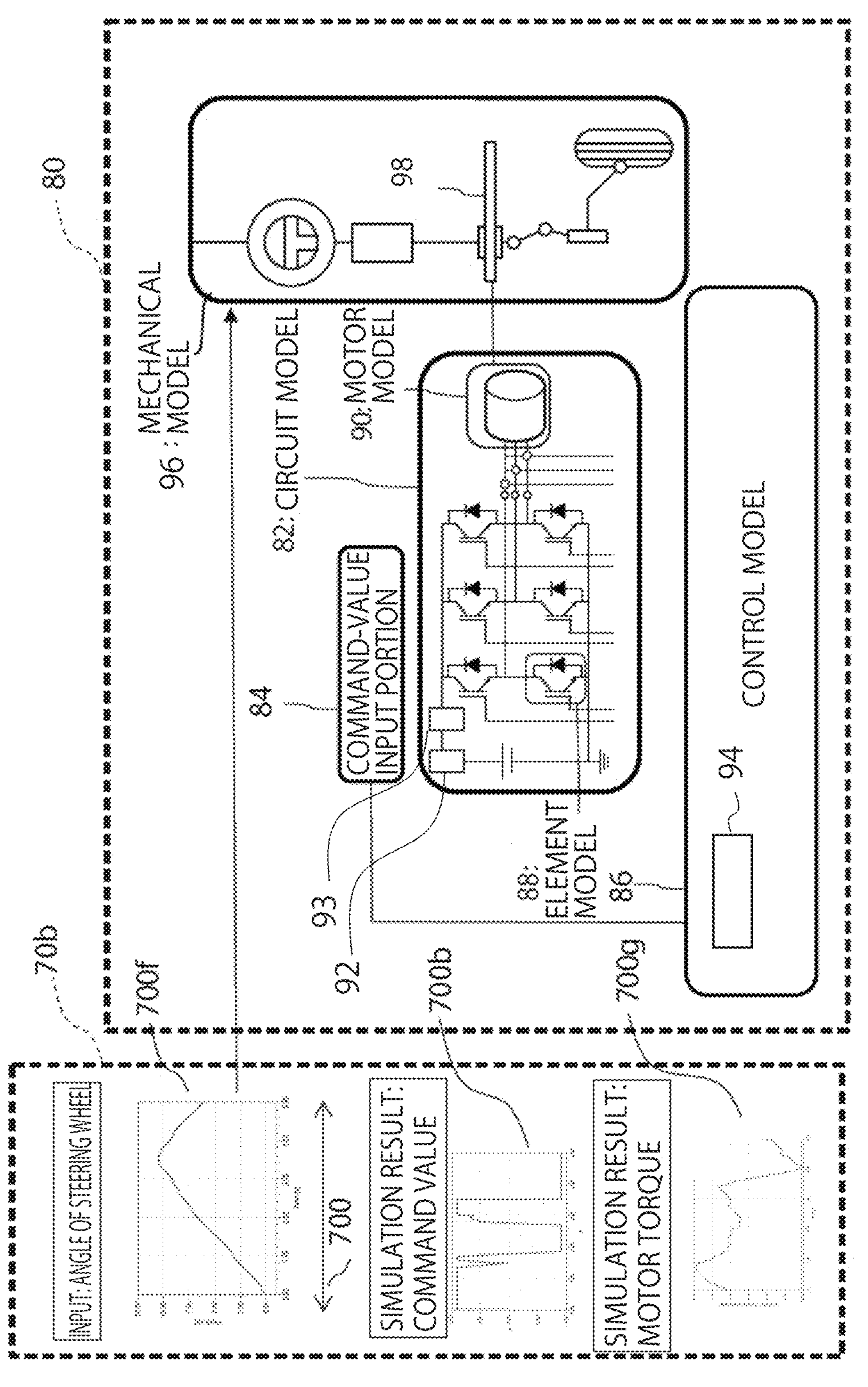
FIG. 29 is a diagram illustrating an image example of a model including a mechanical model, which is to be displayed on a monitor.

FIG. 29 is a diagram illustrating an image example of the model 80 including the mechanical model 96, which is to be displayed on a monitor 700 during simulation. That is, an operation of the mechanical model 96 is being simulated. The length of a calculating step for the operation simulation of the mechanical model 96 is set to a third calculating step that is, for example, about 100 times longer than the length of a calculating step for simulating the model 80. The third calculating step is, for example, a calculating step of 100 microseconds. In addition, the model 80 according to the present embodiment further includes the thermal measurement processor 93.

As illustrated in FIG. 29, the mechanical model 96 is, for example, a model of a steering-wheel auxiliary driving device of an automobile driven by the circuit model 82 of an inverter device.

In FIG. 29, an input command value to the model 80 is an angle 700*f* of a steering wheel of the automobile over time, for example. As described above, a time constant of a response time of the mechanical model 96 is about 100 times larger than a time constant of the circuit model 82. Therefore, the element model 88 used in computation of the mechanical model 96 is changed to the simple element model 88*a*, as described above. Faster computation can be achieved in this way.

That is, the simple mechanical model generator 64 uses the angle 700*f* of the steering wheel of the automobile over time as input of the mechanical model 96, and outputs the motor torque 700*g* of the motor model 90 over time, which is required for driving the steering wheel in an auxiliary manner, and the command value 700*b* that causes generation of the motor torque 700*g* as a result of simulation.

Further, the simple mechanical model generator 64 approximates the motor torque 700*g* generated as described above and the command value 700*b* by a spline model or the like. Accordingly, the motor torque 700*g* and the command value 700*b* corresponding to a calculating step for the model 80, which is about 1/100 times shorter than the calculating step for the mechanical model 96, for example, a calculating step of 100 nanoseconds, are generated.

Next, the execution processor 40 separates the mechanical model 96 and replaces it with a simple model that varies with the motor torque 700*g* generated by the simple mechanical model generator 64. The execution processor 40 then carries out motor current simulation identical to that in the second embodiment in calculating steps of, for example, 100 nanoseconds and stores the simulation result in the storage 20 as a motor current waveform in an actual operation.

The thermal measurement processor 93 then outputs a temperature value in accordance with a motor current in the actual operation by using the thermal tables. The noise measurement processor 94 computes an EMI noise level (f) in accordance with the motor current in the actual operation by using the EMI tables.

Figure 30:
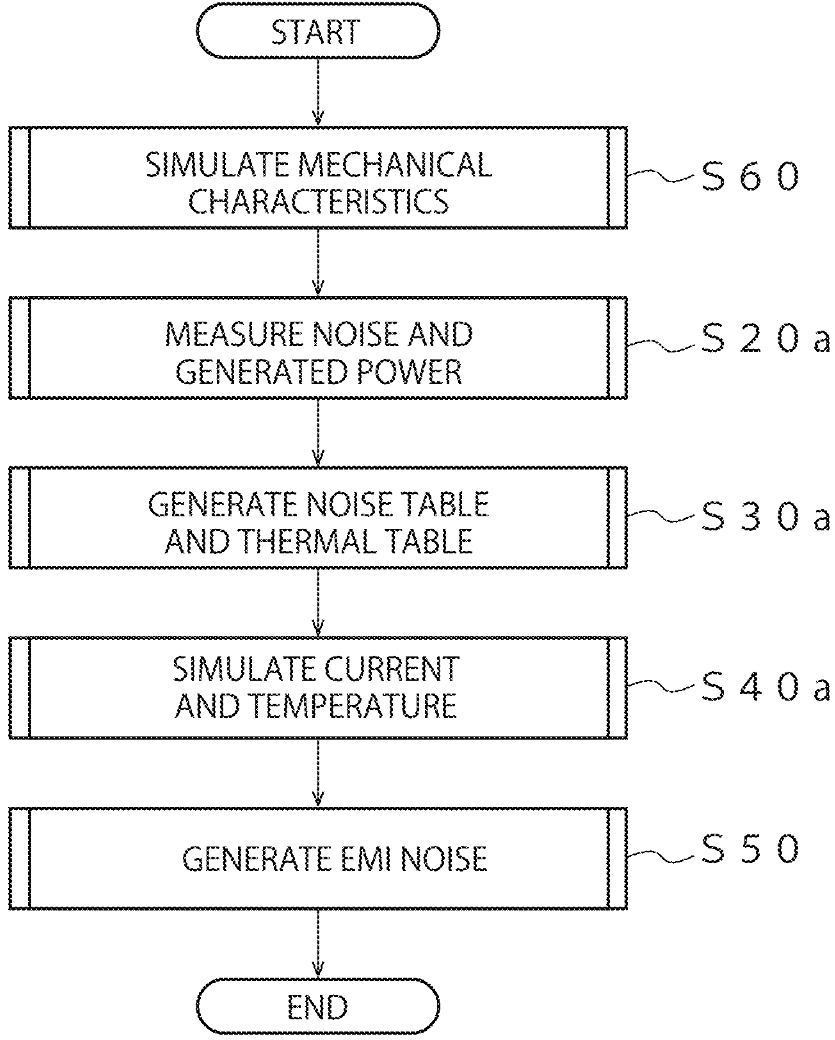
FIG. 30 is a flowchart of an example of a computing process by the arithmetic device according to the third embodiment.

FIG. 30 is a flowchart of an example of a computing process by the arithmetic device 1 according to the third embodiment. As illustrated in FIG. 30, the computing process by the arithmetic device 1 according to the third embodiment is different from the computing process by the arithmetic device 1 according to the second embodiment (see FIG. 22) in that mechanical characteristics simulation and simulation related to a thermal model are added. In the following process example, "a" is added to the step number of the process in which simulation related to a thermal model is added to simulation related to EMI noise, and differences between the arithmetic device 1 according to the third embodiment and the arithmetic device 1 according to the second embodiment (see FIG. 22) are described. In addition, the same step numbers are given to processes equivalent to those in the computing process example by the arithmetic device 1 according to the second embodiment (see FIG. 22), and the descriptions thereof are omitted.

The model generator 30 configures the model 80 including the mechanical model 96 in accordance with input information from the information input portion 10 by using the simple element model 88*a*. That is, the model generator 30 generates the second model 80 that includes the simple circuit model 82 in which the simple models 88*a* each indicating the electrical characteristics of a switching element in the element model 88 by resistance characteristics are connected to each other, the motor model 90 driven by the simple circuit model 82, and the mechanical model 96 having a mechanical structure driven by the motor model 90.

The simple mechanical model generator 64 simulates the mechanical characteristics with respect to the angle 700*f* of a steering wheel of an automobile over time in calculating steps of, for example, 10 microseconds to generate the torque command value 700*b* that instructs a torque output of the motor model 90 and the motor torque 700*g* of the motor model 90. The simple mechanical model generator 64 then stores the motor torque 700*g* and the command value 700*b* that are associated with a calculating step of, for example, 100 nanoseconds in the storage 20 (Step S60). That is, the execution processor 40 computes an operation of the mechanical model 96 in accordance with a mechanical-model command value over time (the angle 700*f* of the steering wheel of the automobile over time) in each third calculating step (10 microseconds) longer than the first calculating step (100 nanoseconds). The simple mechanical model generator 64 then generates the torque command value 700*b* that instructs a torque output of the motor model 90 and the motor torque 700*g* of the motor model 90 through the simulation in the third calculating steps. In this case, an input value to the motor model 90 over time is the motor torque 700*g* that instructs a torque output of the motor model 90 output from the mechanical model 96.

The execution processor 40 replaces the circuit model 82 with the normal element model 88, performs conversion to a control value that causes a motor current to monotonically increase, and computes currents and voltages of each element model 88 and wires in the model 80 in each calculating step of 2.5 nanoseconds (the second calculating step). The execution processor 40 then stores generated power of each element model 88, the currents and the voltages of the wires in the model 80, and a voltage at the predetermined first measurement point, which are calculated in each calculating step of 2.5 nanoseconds (the second calculating step), in the storage 20 (Step S20*a*). That is, the power generated in each of the plurality of element models 88 is computed over time in each second calculating step (2.5 nanoseconds).

Next, the noise model generator 60 generates EMI tables, for example, for every 10 amperes of the motor current and a transfer function H(f) by using the voltage value over time at the first measurement point, and stores them in the storage 20. At the same time, the thermal model generator 62 integrates the generated power generated by switching of each element model 88, computes a representative value, and records the representative value in one of thermal tables for every 10 amperes of the motor current (Step S30*a*). That is, the thermal model generator 62 computes a representative value based on an integrated value obtained by integrating a power value over time in a predetermined period at each of predetermined values (e.g., every 10 amperes) of the motor current, and generates a thermal table in which the representative value is recorded and which corresponds to each of the predetermined values (e.g., every 10 amperes) of the motor current.

Next, the execution processor 40 separates the mechanical model 96, simulates a motor current waveform in an actual operation in each calculating step of 100 nanoseconds (the second calculating step) using the motor torque 700*g* and the command value 700*b* generated at Step S60, and stores the motor current waveform in the storage 20. At this time, the thermal measurement processor 93 simulates the amount of heat generation in each element model 88 using the thermal model and stores the simulation result in the storage 20 as a temperature change waveform (Step S40*a*). The noise measurement processor 94 then computes an EMI noise level (f) in accordance with the motor current waveform in the actual operation by using EMI tables (Step S50). The temperature change waveform corresponds to a temperature value over time.

Figure 31:
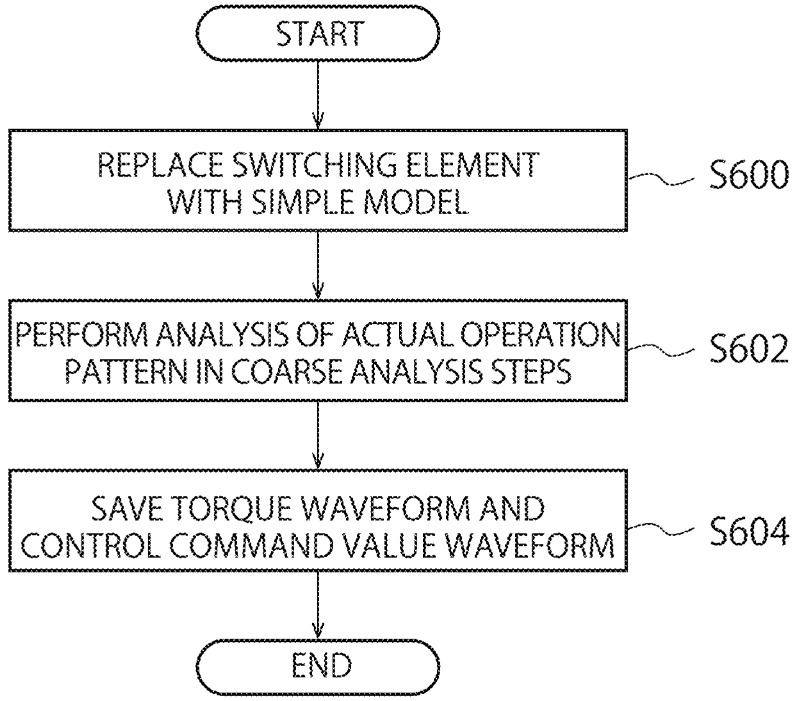
FIG. 31 is a flowchart of a detailed example of the computing process at Step S60.

FIG. 31 is a flowchart of a detailed example of the computing process at Step S60. As illustrated in FIG. 31, the model generator 30 configures the model 80 including the mechanical model 96 in accordance with input information from the information input portion 10 by using the simple element model 88*a* (Step S600).

Next, the simple mechanical model generator 64 uses the angle 700*f* of a steering wheel of an automobile over time as input of the mechanical model 96, and outputs the motor torque 700*g* of the motor model 90 over time, which is required for driving the steering wheel in an auxiliary manner, and the command value 700*b* that causes generation of the motor torque 700*b* in calculating steps of, for example, 10 microseconds (Step S602).

Subsequently, the simple mechanical model generator 64 performs spline interpolation in such a manner that the motor torque 700*g* and the command value 700*b* that causes generation of the motor torque 700*g* are associated with a calculating step of 100 nanoseconds (the second calculating step), and then stores the interpolation result in the storage 20 (Step S604). That is, values of the command value 700*b* and the motor torque 700*g* obtained in the calculating steps of, for example, 10 microseconds are interpolated by a so-called spline function, whereby values of the command value 700*b* and the motor torque 700*g* corresponding to the calculating steps of 100 nanoseconds are generated.

Figure 32:
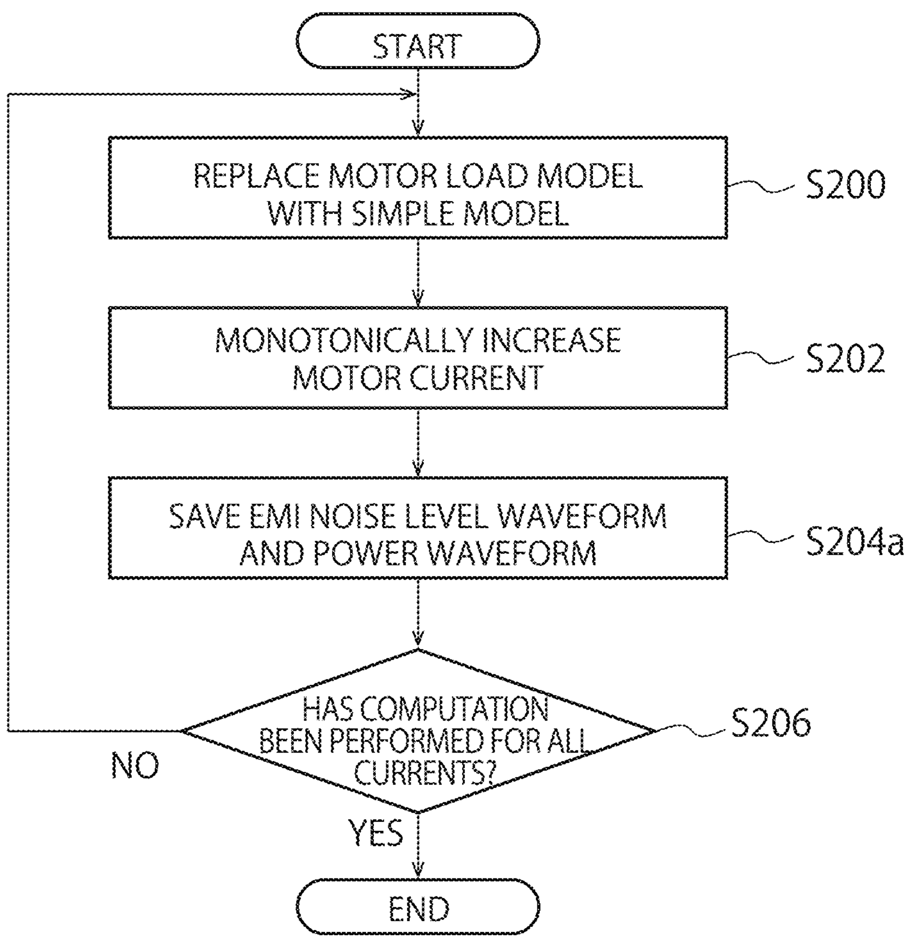
FIG. 32 is a flowchart of a detailed example of the computing process at Step S20*a;*

FIG. 32 is a flowchart of a detailed example of the computing process at Step S20*a*. As illustrated at Step S204*a* in FIG. 32, the execution processor 40 computes a current, a voltage, and generated power of each element model 88 and a voltage at a predetermined measurement point in each calculating step (the second calculating step) of 2.5 nanoseconds and stores them in the storage 20 (Step S204*a*). The process in FIG. 32 is different from that in the flowchart of FIG. 23 in simulating the current, the voltage, and the generated power of each element model 88 and storing them in the storage 20 at Step S204*a*. A time-series value of the generated power corresponds to a power waveform.

Figure 33:
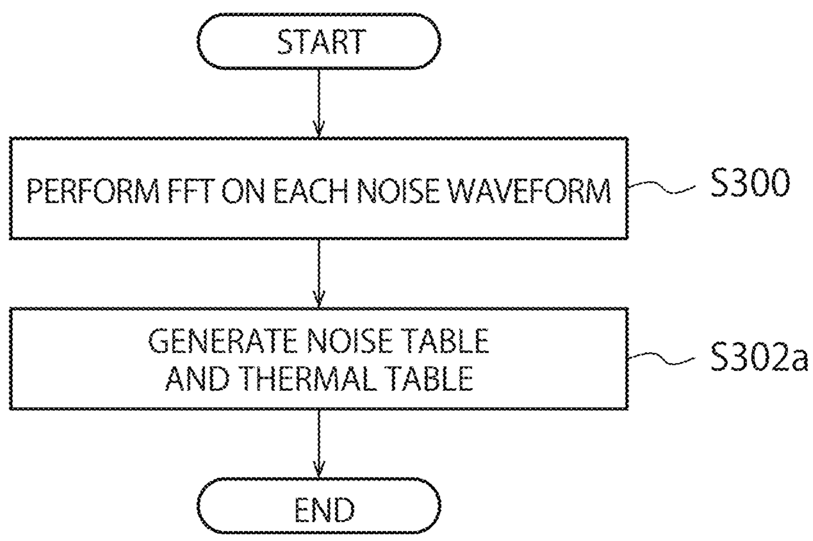
FIG. 33 is a flowchart of a detailed example of the computing process at Step S30*a*.

FIG. 33 is a flowchart of a detailed example of the computing process at Step S30*a*. As illustrated at Step S302*a* in FIG. 33, the noise model generator 60 generates EMI tables, for example, for every 10 amperes and a transfer function H(f) by using a measured voltage value over time at the predetermined first measurement point and stores them in the storage 20. Further, the thermal model generator 62 integrates generated power generated by switching, computes each representative value, generates thermal tables, for example, for every 10 amperes and stores the thermal tables in the storage 20. That is, the process in FIG. 33 is different from that in the flowchart of FIG. 24 in further generating thermal tables for each element model 88 at Step S302*a*.

Figure 34:
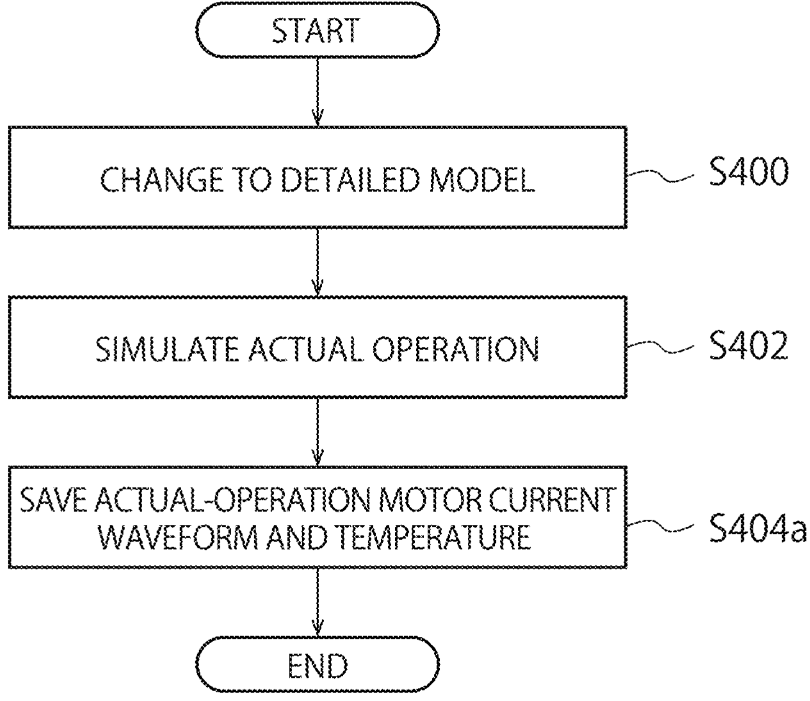
FIG. 34 is a flowchart of a detailed example of the computing process at Step S40*a*.

FIG. 34 is a flowchart of a detailed example of the computing process at Step S40*a*. This flowchart is different from the flowchart of FIG. 25 in that the thermal measurement processor 93 simulates a temperature of each element model 88 over time based on a thermal model using thermal tables and stores the simulation result in the storage 20 as a temperature change waveform, as illustrated at Step S404*a* in FIG. 34.

As described above, according to the present embodiment, first, the arithmetic device 1 simulates an operation of the mechanical model 96 by using a simple model of the circuit model 82 in the third calculating steps (e.g., calculating steps of 100 microseconds) and generates the command value 700*b* over time and the motor torque 700*g* output by the simple mechanical model generator 64 to the control model 86. Subsequently, the simple mechanical model generator 64 generates the command value 700*b* over time and the motor torque 700*g* to correspond to the first calculating steps (the calculating steps of 100 nanoseconds). The arithmetic device 1 then simulates a motor current waveform and a temperature waveform in an actual operation of the circuit model 82 in the first calculating steps by using the command value 700*b* over time and the motor torque 700*g* that correspond to the first calculating steps. The noise measurement processor 94 then computes an EMI noise level (f) in accordance with a motor current in the actual operation by using EMI tables.

Accordingly, it is possible to compute the actual motor current waveform and the actual temperature waveform of the circuit model 82 cooperating with the mechanical model 96 for which the order of the calculating step is about 100 times (a calculating step of 100 microseconds and a calculating step of 100 nanoseconds), in a shorter time. It is also possible to compute the actual EMI noise of the circuit model 82 cooperating with the mechanical model 96 for which the order of the calculating step is about 4000 times (the calculating step of 100 microseconds and the calculating step of 2.5 nanoseconds), in a shorter time.

At least a part of the arithmetic device 1 explained in the above embodiments may be constituted by hardware or software. When it is constituted by software, a program for realizing at least a part of the functions of the arithmetic device 1 may be stored in a recording medium such as a flexible disk or a CD-ROM, to be read and executed by a computer. The recording medium is not limited to a removable medium such as a magnetic disk or an optical disk, and may be a fixed-type recording medium such as a hard disk device or a memory.

Further, a program for realizing at least a part of the functions of the arithmetic device 1 may be distributed via a communication line (including wireless communication) such as the Internet. Furthermore, the program may be distributed in an encrypted, modulated, or compressed state via a wired communication line or a wireless communication line such as the Internet, or the program may be distributed as it is stored in a recording medium.

While certain embodiments have been described, these embodiments have been presented by way of example only, and are not intended to limit the scope of the inventions. Indeed, the novel devices, methods, and programs described herein can be embodied in a variety of other forms. Furthermore, various omissions, substitutions, and changes in the form of the devices, methods, and programs described herein can be made without departing from the spirit of the inventions.

The invention claimed is:

1. An arithmetic method by a computer, comprising:

model generating of generating a model including a circuit model and a motor model driven by the circuit model, the circuit model being configured by a plurality of element models each having information on electrical characteristics of a switching element and connected to each other;

execution processing of computing a motor current of the motor model generated in each of first calculating steps by switching of the element models over time with respect to first input values arranged along a time in a measurement period by using the information on the electrical characteristics of each of the element models;

electromagnetic interference noise generating of generating electromagnetic interference noise in accordance with a frequency at a predetermined measurement point in the model in each of predetermined time segments in the measurement period, and generating an electromagnetic interference noise level at each frequency in the measurement period based on the electromagnetic interference noise level in accordance with the frequency in each of the time segments;

preliminary processing of computing a voltage value at a measurement point generated in each of second calculating steps shorter than the first calculating steps by switching of the element models and the motor current over time with respect to predetermined second input values arranged along the time by using the information on the electrical characteristics of each of the element models; and table generating of performing frequency analysis for voltage values arranged along the time in a predetermined period at a predetermined value of the motor current to generate a table in which the electromagnetic interference noise level at each frequency is recorded and which corresponds to the predetermined value of the motor current.

2. The method of claim 1, wherein the electromagnetic interference noise generating generates, among electromagnetic interference noise levels generated to correspond to respective frequencies in each of the time segments, a maximum electromagnetic interference noise level at each frequency as the electromagnetic interference noise level at each frequency in the measurement period.

3. The method of claim 1, wherein the electromagnetic interference noise generating generates the electromagnetic interference noise level in each of the time segments in accordance with the motor current in each of the time segments.

4. The method of claim 3, wherein the electromagnetic interference noise generating generates the electromagnetic interference noise level in each of the time segments based on the table in which the electromagnetic interference noise level at each frequency is recorded and which corresponds to a motor current.

5. The method of claim 4, further comprising temperature value generating of generating temperature values arranged along the time in the measurement period based on a thermal table corresponding to the motor current.

6. The method of claim 1, wherein:

the table generating generates a plurality of the tables respectively corresponding to a plurality of the predetermined values of the motor current, and the electromagnetic interference noise generating performs interpolation between the electromagnetic interference noise levels at each of the frequencies respectively recorded in the tables to generate the electromagnetic interference noise level in each of the time segments.

7. The method of claim 6, further comprising:

second model generating of generating a second model including a simple circuit model, a motor model driven by the simple circuit model, and a mechanical model having a mechanical structure driven by the motor model, the simple circuit model being configured by a plurality of simple models that each represent the electrical characteristics of the switching element in the element model by resistive characteristics and that are connected to each other; and second execution processing of computing an operation of the mechanical model in accordance with mechanical-model command values arranged along a time in each of third calculating steps longer than the first calculating steps, wherein the first input value is a torque instruction value instructing a torque output of the motor model output from the mechanical model and a motor torque of the motor model.

8. The method of claim 1, wherein;

the preliminary processing computes power generated in each of the element models in each of the second calculating steps over time, and the method further comprises thermal table generating of computing a representative value based on an integrated value obtained by integrating power values arranged along the time in the predetermined period at the predetermined value of the motor current in order to generate a thermal table in which the representative value is recorded and which corresponds to the predetermined value of the motor current.

9. An arithmetic device comprising:

a model generator configured to generate a model including a circuit model and a motor model driven by the circuit model, the circuit model being configured by a plurality of element models each having information on electrical characteristics of a switching element and connected to each other;

an execution processor configured to compute a motor current of the motor model generated in each of first calculating steps by switching of the element models over time with respect to first input values arranged along a time in a measurement period by using the information on the electrical characteristics of each of the element models, wherein the execution processor computes a voltage value at the measurement point generated in each of second calculating steps shorter than the first calculating steps by switching of the element models and the motor current over time with respect to predetermined second input values arranged along the time by using the information on the electrical characteristics of each of the element models;

a noise measurement processor configured to generate electromagnetic noise in accordance with a frequency at a predetermined measurement point in the model in each of predetermined time segments in the measurement period and generate an electromagnetic interference noise level at each frequency in the measurement period based on the electromagnetic interference noise level in accordance with a frequency in each of the time segments; and a noise model generator configured to perform frequency analysis for voltage values arranged along the time within a period at a predetermined value of the motor current to generate a table in which an electromagnetic interference noise level at each frequency is recorded and which corresponds to the predetermined motor current.

10. The device of claim 9, wherein the noise measurement processor generates, among electromagnetic interference noise levels generated to correspond to respective frequencies in each of the time segments, a maximum electromagnetic interference noise level at each frequency as the electromagnetic interference noise level at each frequency in the measurement period.

11. The device of claim 10, wherein the noise measurement processor generates the electromagnetic interference noise level in each of the time segments in accordance with a motor current in each of the time segments.

12. The device of claim 11, wherein the noise measurement processor generates the electromagnetic interference noise level in each of the time segments based on the table in which the electromagnetic interference noise level at each frequency is recorded and which corresponds to a motor current.

13. The device of claim 12, further comprising a noise model generator configured to generate a plurality of the tables respectively corresponding to a plurality of the different motor currents, wherein the noise measurement processor performs interpolation between the electromagnetic interference noise levels at each of the frequencies respectively recorded in the tables to generate the electromagnetic interference noise level in each of the time segments.

14. The device of claim 9, further comprising a thermal measurement processor configured to generate temperature values arranged along the time in the measurement period based on a thermal table corresponding to the motor current.

15. The device of claim 10, wherein the execution processor computes power generated in each of the element models in each of the second calculating steps over time, and the device further comprises a thermal model generator configured to generate a thermal model that outputs an output value based on an integrated value obtained by integrating the power generated in each of the second calculating steps, in accordance with switching of the element model.

16. The device of claim 15, wherein the thermal model generator records a value obtained by dividing the integrated value in each of a conducting state and a non-conducting state of the element model by a predetermined time or the integrated value in the thermal table as a representative value in each of the conducting state and the non-conducting state of the element model.

17. The device of claim 16, further comprising a thermal measurement processor configured to compute a temperature value of the element model in each of the first calculating steps over time by using an output value generated using the thermal table for each of the conducting state and the non-conducting state.

18. An arithmetic device, comprising;

a model generator configured to generate a model including a circuit model and a motor model driven by the circuit model, the circuit model being configured by a plurality of element models each having information on electrical characteristics of a switching element and connected to each other;

an execution processor configured to compute a motor current of the motor model generated in each of first calculating steps by switching of the element models over time with respect to first input values arranged along a time in a measurement period by using the information on the electrical characteristics of each of the element models; and a noise measurement processor configured to generate electromagnetic noise in accordance with a frequency at a predetermined measurement point in the model in each of predetermined time segments in the measurement period and generate an electromagnetic interference noise level at each frequency in the measurement period based on the electromagnetic interference noise level in accordance with a frequency in each of the time segments, wherein:

the model generator generates a second model including a simple circuit model, a motor model driven by the simple circuit model, and a mechanical model having a mechanical structure driven by the motor model, the simple circuit model being configured by a plurality of simple models that each represent the electrical characteristics of the switching element in the element model by resistive characteristics and are connected to each other, the execution processor computes an operation of the mechanical model in accordance with mechanical-model command values arranged along a time in each of third calculating steps longer than the first calculating steps, and each of the first input values arranged along the time is a torque instruction value instructing a torque output of the motor model output from the mechanical model and a motor torque of the motor model.

* * * * *